(12) United States Patent
Liu

(10) Patent No.: US 12,547,331 B2
(45) Date of Patent: Feb. 10, 2026

(54) STORAGE FORMAT CONVERSION METHOD, SYSTEM AND APPARATUS, AND ELECTRONIC DEVICE AND STORAGE MEDIUM

(71) Applicant: IEIT SYSTEMS CO., LTD., Shandong (CN)

(72) Inventor: Ke Liu, Shandong (CN)

(73) Assignee: IEIT SYSTEMS CO., LTD., Shandong (CN)

( * ) Notice: Subject to any disclaimer, the term of this patent is extended or adjusted under 35 U.S.C. 154(b) by 0 days.

(21) Appl. No.: 18/878,024

(22) PCT Filed: Mar. 28, 2023

(86) PCT No.: PCT/CN2023/084271
§ 371 (c)(1),
(2) Date: Feb. 26, 2025

(87) PCT Pub. No.: WO2024/098626
PCT Pub. Date: May 16, 2024

(65) Prior Publication Data
US 2025/0258618 A1    Aug. 14, 2025

(30) Foreign Application Priority Data
Nov. 9, 2022   (CN) .......................... 202211395237.5

(51) Int. Cl.
*G06F 12/00*     (2006.01)
*G06F 3/06*      (2006.01)

(52) U.S. Cl.
CPC .......... *G06F 3/0638* (2013.01); *G06F 3/0604* (2013.01); *G06F 3/0673* (2013.01)

(58) Field of Classification Search
None
See application file for complete search history.

(56) References Cited

U.S. PATENT DOCUMENTS

2012/0173515 A1    7/2012    Jeong et al.
2016/0147801 A1    5/2016    Wein et al.
(Continued)

FOREIGN PATENT DOCUMENTS

CN    102999519 A    3/2013
CN    106874437 A    6/2017
(Continued)

OTHER PUBLICATIONS

Roozkhosh, S., Hoornaert, D., Mun, J. H., Papon, T. I., Sanaullah, A., Drepper, U., . . . & Athanassoulis, M. (2021). Relational memory: Native in-memory accesses on rows and columns. arXiv preprint arXiv:2109.14349. (Year: 2021).*

(Continued)

*Primary Examiner* — Daniel D Tsui
(74) *Attorney, Agent, or Firm* — IPro, PLLC

(57) ABSTRACT

Disclosed in the present application are a storage format conversion method, system and apparatus, and an electronic device and a storage medium, which are applied to the technical field of storage. The method is applied to a coprocessor. The method comprises: acquiring row storage page data and configuration information, which are sent by a main processor, wherein the configuration information comprises format information of each column field in a row storage page; parsing the row storage page data according to the configuration information, so as to obtain a column descriptor, wherein the column descriptor comprises a first offset address and field length of each column field in the row storage page; performing calculation according to the column descriptor, so as to obtain filling information related to a column storage page.

20 Claims, 19 Drawing Sheets

(56) References Cited

U.S. PATENT DOCUMENTS

| | | | |
|---|---|---|---|
| 2017/0109398 A1 | 4/2017 | Stearn et al. |
| 2017/0285951 A1 | 10/2017 | Greenwald et al. |
| 2020/0293545 A1 | 9/2020 | Li et al. |

FOREIGN PATENT DOCUMENTS

| | | | |
|---|---|---|---|
| CN | 108875077 A | 11/2018 |
| CN | 109542889 A | 3/2019 |
| CN | 110109910 A | 8/2019 |
| CN | 110309233 A | 10/2019 |
| CN | 110990402 A | 4/2020 |
| CN | 114647635 A | 6/2022 |
| CN | 115438114 A | 12/2022 |
| JP | 2020098479 A | 6/2020 |
| WO | 2022068328 A1 | 4/2022 |

OTHER PUBLICATIONS

Yu, Lisheng, et al. "Research on simulative column-storage model policy based on row-storage model." J. Comput. Res. Dev 47 (2010): 78-885.

Zhiying Dai. "Analysis on Coal Mine Safety Monitoring Data Based on Column-oriented Database." Coal Technology. 32(11). Nov. 2013.

\* cited by examiner

| ID | name | age | job | salary |
|---|---|---|---|---|
| 1 | Tom | 25 | Sales | 17000 |
| 2 | Jerry | 30 | Sales | 15000 |
| 3 | Harry | 40 | Engineer | 26000 |
| 4 | Tony | 29 | Buyer | 14000 |
| 5 | Lucy | 23 | Secretary | 10000 |

| | ID | name | age | job | salary |
|---|---|---|---|---|---|
| column field type | 23 | 1043 | 23 | 1043 | 701 |
| column field length | 4 | -1 | 4 | -1 | 8 |
| column field alignment | 4 | 1 | 4 | 1 | 8 |

| 5 | | | } number of
| --- | --- | --- |
| -1/(1, 3, 5) | | | } column index of sorted column
| 23 | 4 | 4 | } column 1
| 1043 | -1 | 1 | } column 2
| 23 | 4 | 4 | } column 3
| 1043 | -1 | 1 | } column 4
| 701 | 8 | 8 | } column 5

FIG. 9

|  | A | B | C | D | E |
|---|---|---|---|---|---|
| atttype (field type) | integer | string | integer | string | float |
| attlen (field length) | 4 | -1 | 4 | -1 | 8 |
| attalign (field alignment) | 4 | 1 | 4 | 1 | 8 |

STORAGE FORMAT CONVERSION METHOD, SYSTEM AND APPARATUS, AND ELECTRONIC DEVICE AND STORAGE MEDIUM

CROSS-REFERENCE TO RELATED APPLICATION

This application claims the priority of Chinese patent application filed in CNIPA on Nov. 9, 2022, with the application number of 202211395237.5 and the application name of "storage format conversion method, system and apparatus, and electronic device and storage medium", the entire contents of which are incorporated into this application by reference.

FIELD

The present disclosure relates to the technical field of storage, in particular to a storage format conversion method, system and apparatus, and electronic device and storage medium.

BACKGROUND

Traditional relational databases mostly use row storage mode to store data. When the row storage mode is adopted, and fields of different types and lengths are continuously stored in the same row, which is more suitable for OLTP (On-line Transaction Processing) business and can obtain better performance when adding, deleting and modifying databases. However, for OLAP (On-line Analytical Processing) business, when querying data, it is necessary to read all the data in a row under the row storage mode, and then extract the valid fields, which increases the overhead of IO reading and field parsing, and will lead to a large query delay when there is a large amount of data. Therefore, in order to improve the OLAP performance of the database, a column storage mode is proposed. In the column storage mode, data is stored by columns, and only the required columns need to be read when conducting OLAP query business, thus reducing the IO overhead and the overhead of parsing rows and columns. However, although the column storage mode has higher performance for OLAP business, it has poor performance for OLTP business. Take an insertion of data as an example: because the data is input by rows, in the column storage mode, the data needs to be disassembled by rows and columns before being appended to the corresponding columns, and the process of disassembling rows and columns will lead to a decline of data writing performance.

In order to give consideration to the performance of OLTP and OLAP, some researches adopt the method of mixed rows and columns. When OLTP business is carried out in a database, the data is stored to the disk according to the row storage mode. When a database carries out OLAP business, the row storage data is converted into column storage mode and stored in memory or disk. In order to achieve this goal, it is necessary to realize a row-column conversion function first. In the related art, the row-column conversion operation mostly depends on a CPU, which needs to consume a lot of CPU computing power resources during the operation. Moreover, some ways of using coprocessor to convert rows and columns can greatly reduce the computing power consumption of CPU, but length of rows must be predicted in the scheme, and only fixed-length data types can be supported, but variable-length data types cannot be supported. However, in most relational databases, there are variable-length data, and length of each row is allowed to be different, so it is impossible to predict the length of the row before calculation. Therefore, although the implementation method can obtain high data throughput, it can't handle variable-length data, which limits its applicable scenario.

Therefore, it is an urgent problem for persons skilled in this field to realize the conversion of row-column storage format that can support variable-length field data and improve the applicability of the row-column conversion method.

SUMMARY

The purpose of the present disclosure is to provide a storage format conversion method, which can realize conversion of row-column storage format that can support variable-length field data and improve the applicability of the storage format conversion method. Another purpose of the present disclosure is to provide another storage format conversion method, storage format conversion system, storage format conversion apparatus, electronic device and non-transitory readable storage medium, all of which have the above beneficial effects.

On one aspect, the present disclosure provides a storage format conversion method applied to a coprocessor, including:
  acquiring row storage page data and configuration information sent by a main processor, wherein the configuration information includes format information of each column field in a row storage page;
  parsing the row storage page data according to the configuration information to obtain a column descriptor, wherein the column descriptor includes a first offset address and field length of each column field in the row storage page;
  calculating and obtaining filling information related to a column storage page according to the column descriptor, wherein the filling information includes a first offset address and column length of each data column in the column storage page, wherein each column field with the same field attribute constitutes a data column;
  filling the column storage page according to the filling information to generate column storage page data;
  feeding back the column storage page data to the main processor.

In some embodiments of the present disclosure, parsing the row storage page data according to the configuration information to obtain a column descriptor includes:
  determining a data storage format of the row storage page data;
  parsing the row storage page data according to the data storage format and the configuration information to obtain the column descriptor;
  wherein the configuration information is generated by the main processor based on a tuple descriptor corresponding to the row storage page data.

In some embodiments of the present disclosure, the tuple descriptor is created at the same time as a relational database creating a data table of a row storage page type, and the tuple descriptor is configured to describe format information of each column field in the data table.

In some embodiments of the present disclosure, the data storage format of the row storage page data includes any one or more of the following:
  a storage location of data information itself, a storage location of metadata of data information and a storage location of description information of data information.

In some embodiments of the present disclosure, the filling information further includes a first offset address and field length of each variable-length column field, and a maximum value and a minimum value of a fixed-length data column, and the filling the column storage page according to the filling information to generate column storage page data includes:

according to the first offset address and the column length of each data column in the column storage page, filling each column field into a field area of the column storage page;

filling the first offset address and the field length of each variable-length column field into a variable-length field index area of the column storage page;

filling the first offset address and the column length of each data column, and the maximum value and the minimum value of the fixed-length data column into a column data index area of the column storage page.

In some embodiments of the present disclosure, filling the column storage page according to the filling information to generate column storage page data includes:

determining a data storage format of the column storage page;

filling the filling information into the column storage page according to the data storage format to generate the column storage page.

In some embodiments of the present disclosure, further including:

acquiring a field alignment mode of a column field in preset configuration information;

during a filling process, performing filling alignment according to the data storage format.

In some embodiments of the present disclosure, after parsing the row storage page data to obtain a column descriptor, the method further includes:

acquiring sorting enabling information;

determining sorting data columns according to the sorting enabling information;

sorting column descriptors according to a sorting mode of the sorted data columns to obtain sorted column descriptors.

In some embodiments of the present disclosure, the coprocessor includes a first preset number of computing units and the first preset number of memories, each computing unit corresponds to one of the memories, and the obtaining row storage page data sent by a main processor includes:

reading from the memory corresponding to the current computing unit to obtain the row storage page data, and sending the row storage page data to the memory by the main processor.

In some embodiments of the present disclosure, each computing unit includes a second preset number of execution channels, and reading from the memory corresponding to the current computing unit to obtain the row storage page data includes:

reading from the memory corresponding to the current computing unit to obtain the second preset number of row storage page data;

after reading from the memory corresponding to the current computing unit to obtain the row storage page data, the method further including:

distributing the second preset number of row storage page data to the second preset number of execution channels, so as to use each execution channel to execute a step of parsing the row storage page data to obtain the column descriptor.

In some embodiments of the present disclosure, feeding back the column storage page data to the main processor includes:

writing back each column storage page to the memory corresponding to the current computing unit, to enable the main processor read and obtain each column storage page data from each memory.

In some embodiments of the present disclosure, before feeding back the column storage page data to the main processor, the method further includes:

compressing each column field in the column storage page data according to a preset compression algorithm corresponding to each data column to obtain compressed column storage page data.

In some embodiments of the present disclosure, the compressing each column field in the column storage page data according to a preset compression algorithm corresponding to each data column to obtain compressed column storage page data includes:

determining data types of column fields in each data column, determining a corresponding preset compression algorithm according to the data types, and performing compression processing on each column field in the column storage page data according to the preset compression algorithm.

On second aspect, the present disclosure provides a storage format conversion method applied to a main processor, including:

acquiring row storage page data and tuple descriptors corresponding to the row storage page data;

generating configuration information related to the row storage page data according to the tuple descriptors, wherein the configuration information includes format information of each column field in the row storage page data;

sending the row storage page data and the configuration information to a coprocessor, to enable the coprocessor convert the row storage page data into column storage page data according to the configuration information;

acquiring the column storage page data fed back by the coprocessor;

wherein a process of converting the row storage page data into the column storage page data by the coprocessor according to the configuration information includes the following steps:

parsing the row storage page data according to the configuration information to obtain a column descriptor, wherein the column descriptor includes a first offset address and field length of each column field in the row storage page;

calculating and obtaining filling information related to a column storage page according to the column descriptor, wherein the filling information includes a first offset address and column length of each data column in the column storage page, wherein each column field with the same field attribute constitutes a data column;

filling the column storage page according to the filling information to generate column storage page data.

On third aspect, the present disclosure provides a storage format conversion system including a main processor and a coprocessor;

the main processor is configured to send row storage page data and configuration information to the coprocessor, and acquire column storage page data fed back by the coprocessor;

the coprocessor is configured to parse the row storage page data according to the configuration information to obtain a column descriptor, wherein the column descriptor includes a first offset address and field length of each column field in the row storage page; calculate and obtain filling information related to a column storage page according to the column descriptor, wherein the filling information includes a first offset address and column length of each data column in the column storage page, wherein each column field with the same field attribute constitutes a data column; fill the column storage page according to the filling information to generate column storage page data.

In some embodiments of the present disclosure, the main processor is a CPU and the co-processor is an FPGA.

On fourth aspect, the present disclosure provides a storage format conversion apparatus applied to a coprocessor, including:

an acquisition module, configured to acquire row storage page data and configuration information sent by a main processor, wherein the configuration information includes format information of each column field in a row storage page;

a parsing module is configured to parse the row storage page data according to the configuration information to obtain a column descriptor, wherein the column descriptor includes a first offset address and field length of each column field in the row storage page;

a calculation module, configured to calculate and obtain filling information related to a column storage page according to the column descriptor, wherein the filling information includes a first offset address and column length of each data column in the column storage page, wherein each column field with the same field attribute constitutes a data column;

a filling module is configured to fill the column storage page according to the filling information to generate column storage page data;

a feedback module is configured to feed back the column storage page data to the main processor.

On fifth aspect, the present disclosure provides a storage format conversion apparatus applied to a main processor, including:

a first acquisition module, configured to acquire row storage page data and tuple descriptors corresponding to the row storage page data;

a generating module, configured to generate configuration information related to the row storage page data according to the tuple descriptors, wherein the configuration information includes format information of each column field in the row storage page data;

a sending module is configured to send the row storage page data and the configuration information to a coprocessor, to enable the coprocessor convert the row storage page data into column storage page data according to the configuration information;

a second acquisition module, configured to acquire the column storage page data fed back by the coprocessor;

wherein a process of converting the row storage page data into the column storage page data by the coprocessor according to the configuration information includes the following steps:

parsing the row storage page data according to the configuration information to obtain a column descriptor, wherein the column descriptor includes a first offset address and field length of each column field in the row storage page;

calculating and obtaining filling information related to a column storage page according to the column descriptor, wherein the filling information includes a first offset address and column length of each data column in the column storage page, wherein each column field with the same field attribute constitutes a data column;

filling the column storage page according to the filling information to generate column storage page data.

On sixth aspect, the present disclosure provides an electronic device, including:

a memory, configured to store a computer program;

a processor, configured to implement steps of any one of the storage format conversion methods described above when executing the computer program.

On seventh aspect, the present disclosure provides a non-transitory readable storage medium, wherein a computer program is stored on the non-transitory readable storage medium, and when the computer program is executed by a processor, steps of any one of the storage format conversion methods described above are implemented.

By applying the technical scheme provided by the present disclosure and combining with the coprocessor to realize the conversion of row-column storage format, large consumption of computing power resources of the main processor can be effectively avoided, and higher working efficiency can be ensured. Meanwhile, the row storage page data is parsed by combining with configuration information to obtain the offset address and field length of each column field in the row storage page data, and then the first offset address and field length of each data column in the column storage page are calculated, and the column storage page data corresponding to the row storage page data is generated, thus realizing the conversion of the row-column storage format. It can be seen that this implementation method takes the position information and field length of each column field into account, realizes the conversion of the row-column storage format that can support variable-length field data, and effectively improves the applicability of the row-column conversion method.

BRIEF DESCRIPTION OF THE DRAWINGS

In order to explain the technical scheme in the prior art and the embodiments of the present disclosure more clearly, the following will briefly introduce appended drawings needed in the description of the prior art and the embodiments of the present disclosure. Certainly, the following appended drawings related to the embodiments of the present disclosure only describe a part of the embodiments in the present disclosure. For persons skilled in this field, other drawings can be obtained according to the provided drawings without expenditure of creative labor, and the obtained other drawings also belong to the protection scope of the present disclosure.

FIG. 9 is a schematic diagram of a configuration parameter code stream provided by the present disclosure;

DETAILED DESCRIPTION

The core of the present disclosure is to provide a storage format conversion method, which can realize the conversion of the row-column storage format that can support variable-length field data and improve the applicability of the storage format conversion method. Another core of the present disclosure is to provide another storage format conversion method, storage format conversion system, storage format conversion apparatus, electronic device and non-transitory readable storage medium, all of which have the above beneficial effects.

In order to describe the technical scheme in the embodiments of the present disclosure more clearly and completely, the technical scheme in the embodiments of the present disclosure will be introduced below with the appended drawings. Apparently, the described embodiments are only a part of the embodiments of the present disclosure, not the whole embodiments. Based on the embodiments in the present disclosure, all other embodiments obtained by persons skilled in this field without expenditure of creative work belong to the protection scope of the present disclosure.

It should be noted that the storage format conversion method provided by the present disclosure is applied to a storage format conversion system. Please refer to FIG. 1, which is a structural schematic diagram of a storage format conversion system provided by the present disclosure. The storage format conversion system includes a main processor 100 and a coprocessor 200, which can perform cooperative processing to realize storage format conversion. In one possible implementation, the main processor can be a CPU, and the coprocessor can be an FPGA (Field Programmable Gate Array, a high-performance programmable logic device).

The embodiment of the present disclosure provides a storage format conversion method.

Figure 2:
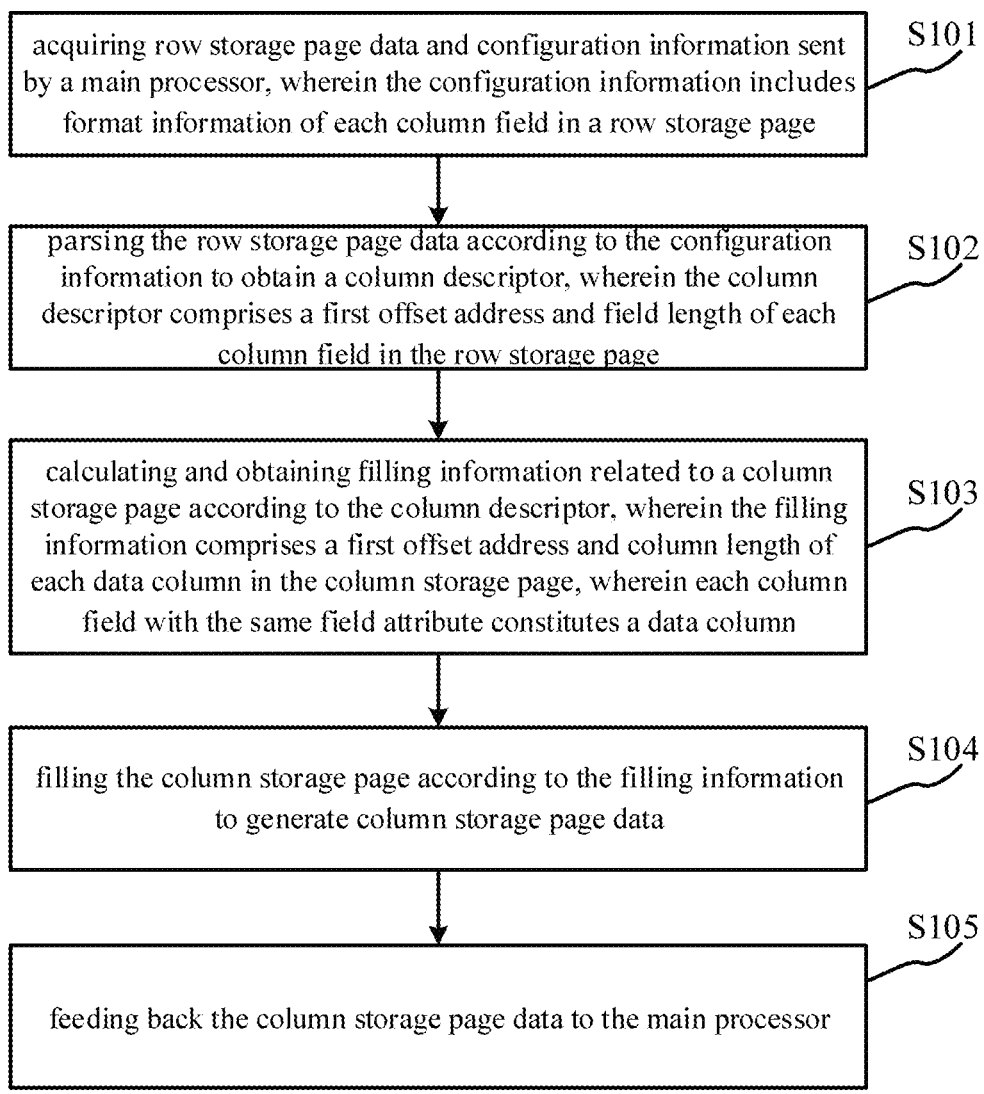
FIG. 2 is a flowchart of a storage format conversion method provided by the present disclosure.

Please refer to FIG. 2, which is a flow chart of a storage format conversion method provided by the present disclosure. The storage format conversion method is applied to a coprocessor, and may include the following steps of S101 to S105.

S101: acquiring row storage page data and configuration information sent by a main processor, wherein the configuration information includes format information of each column field in a row storage page;

The purpose of this step is to acquire the row storage page data and the configuration information. Wherein, the row storage page data refers to page data stored in a row storage format, and the corresponding column storage page data can be obtained by row-column conversion of the row storage page data, that is, the page data stored in a column storage format. The configuration information includes the format information of each column field in a row storage page, and the column field refers to the data information stored in the row storage page, which can be a fixed-length field or a variable-length field, such as character string, number, date, etc. The format information includes, but is not limited to, field length, field alignment and field type of each column field.

It should be noted that the storage format conversion method provided by the embodiment of the present disclosure is applied to a coprocessor, and both the row storage page data and the configuration information are sent to the coprocessor by the main processor. That is to say, when a conversion of the row-column storage format is needed, the row storage page data that need the conversion of the row-column storage format and its configuration information are sent to the coprocessor by the main processor to perform the conversion of the row-column storage format operation, so that the corresponding column storage page data can be obtained, thereby realizing the conversion of the row-column storage format.

S102, parsing the row storage page data according to the configuration information to obtain a column descriptor, wherein the column descriptor includes a first offset address and field length of each column field in the row storage page;

This step aims to achieve the parsing operation of the row storage page data to obtain the column descriptor corresponding to the row storage page data. Wherein, the column descriptor includes the first offset address and field length of each column field in the row storage page, and the first offset address is the first offset position of the corresponding column field in the row storage page; The field length is the field length of the corresponding column field, the field length of the fixed-length field is fixed, and the field length of the variable-length field is not fixed. Apparently, the column descriptor takes into account the first offset address and field length of each column field, which is helpful to realize the conversion of row-column storage format that can support variable-length field data and can effectively improve the applicability of the row-column conversion method.

Certainly, the information included in the column descriptor is not limited to this, and it can also include other types of data information, which can be set by technicians according to actual requirements (such as the storage format requirements of column storage pages), which is not limited in the present disclosure.

In one possible implementation, the parsing the row storage page data according to the configuration information to obtain the column descriptor may include: determining the data storage format of the row storage page data; according to the data storage format and the configuration information to obtain a column descriptor; wherein, the configuration information is generated by the main processor based on a tuple descriptor corresponding to the row storage page data.

The embodiment of the present disclosure provides an implementation method for parsing row storage page data to obtain column descriptors. Specifically, the row storage page itself is preset with different storage formats, such as a storage location of the data information itself, a storage location of metadata of the data information, a storage location of description information of the data information, etc. Therefore, the row storage page data can be parsed in combination with the data storage format of the row storage page.

It can be understood that for a general relational storage database (such as PostgreSQL, an open source relational database), when creating a data table with a row storage page type, a tuple descriptor will be created at the same time, and the tuple descriptor is used to describe the format information of each column field in the data table, such as field length, field alignment, field type, etc. Therefore, the above configuration information can be generated based on the tuple descriptor, so that the configuration information can also include the above format information of each column field.

S103, calculating and obtaining filling information related to a column storage page according to the column descriptor, wherein the filling information includes a first offset address and column length of each data column in the column storage page, wherein each column field with the same field attribute constitutes a data column;

The purpose of this step is to calculate the filling information in the column storage page, and the filling information is used to indicate a implementation mode of storing each column field in the row storage page to the column storage page, mainly including the first offset address and column length of each data column in the column storage page, so that each column field in the row storage page can be stored to the column storage page according to this information, thus realizing the conversion of the row-column storage mode.

Moreover, similar to the above-mentioned column descriptors, the information included in the filling information is not limited to this, but also includes other types of data information, which can be set by technicians according to actual requirements (such as the storage format requirements of column storage pages), which is not limited in the present disclosure.

It can be understood that the column descriptor corresponds to the row storage page, mainly including the first offset address and field length of each column field in the row storage page, while the filling information corresponds to the column storage page, mainly including the first offset address and column length of each data column in the column storage page. Wherein the data column is composed of each column field with the same field attribute (in other words, all column fields corresponding to the same key value in the row storage page data are called a data column), for example, all column fields whose field attribute is 'Salary' form a single data column. It should be noted that the first offset address and column length of each data column in the filling information in the column storage page can be calculated from the first offset address and field length of each column field in the column descriptor.

S104, filling the column storage page according to the filling information to generate column storage page data.

The purpose of this step is to realize the filling processing of column storage pages and obtain column storage pages corresponding to row storage pages, so as to realize the conversion of row-column storage format. As mentioned above, the filling information includes the first offset address and column length of each data column in the column storage page. On the basis of this, each column field in the row storage page data can be copied to the column storage page directly according to the filling information, thus generating column storage page data.

In one possible implementation, the above filling information may also include the first offset address and field length of each variable-length column field, and a maximum value and a minimum value of fixed-length data columns. The above filling the column storage page according to the filling information to generate column storage page data may include the following steps:

according to the first offset address and column length of each data column in the column storage page, filling each column field into a field area of the column storage page;

filling the first offset address and field length of each variable-length column field into a variable-length field index area of the column storage page;

filling the first offset address and column length of each data column, and the maximum and minimum values of fixed-length data columns into the column data index area of the column storage page.

The embodiment of the present disclosure provides an implementation method for filling a column storage page based on filling information. First, in addition to the first offset address and column length of each data column in the column storage page, the filling information can also include the first offset address and field length of each variable-length column field, and the maximum and minimum values of fixed-length data columns. Wherein all column fields corresponding to the same key value in the row storage page data are called a data column, and each data column corresponds to a key value; if the column field corresponding to a key value is a variable-length field, then the data column corresponding to the key value is a variable-length data column. If the column field corresponding to a key value is a fixed-length field, then the data column corresponding to the key value is a fixed-length data column. Further, the column storage page includes a field area, a variable-length field index area and a column data index area, wherein the field area is used to store each column field in the row storage page data, and the column fields can be filled into the field area according to the first offset address and column length of each data column in the column storage page; The variable-length field index area is used to store the first offset address and field length of each variable-length column field; The column data index area is used to store the first offset address and column length of each data column, and the maximum and minimum values of fixed-length data columns. Wherein, when filling data, it can be realized by referring to the data storage format of the column storage page. Moreover, it can also be combined with field alignment of the column fields in the preset configuration information to realize filling alignment.

S105: feeding back the column storage page data to the main processor.

The purpose of this step is to realize the feedback of column storage pages. After converting row storage pages into column storage pages, it can be fed back to the main processor, and the main processor will continue the corresponding business processing.

It can be seen that the storage format conversion method provided by the embodiment of the present disclosure, combined with the coprocessor, realizes the conversion of row-column storage format, which can effectively avoid large consumption of computing power resources of the main processor and ensure high working efficiency. Meanwhile, the row storage page data is parsed combined with the configuration information to obtain the offset address and field length of each column field in the row storage page data, and then the first offset address and field length of each data column in the column storage page are calculated and obtained to generate the column storage page data corresponding to the row storage page data, thus realizing the conversion of the row-column storage format. It can be seen that this implementation method takes the position information and field length of each column field into account, realizes the conversion of the row-column storage format that can support variable-length field data, and effectively improves the applicability of the row-column conversion method.

In one embodiment of the present disclosure, after parsing the row storage page data to obtain the column descriptor, it may further include the following steps:
acquiring sorting enabling information;
determining sorting data columns according to the sorting enabling information;
sorting column descriptors according to a sorting mode of the sorted data columns to obtain sorted column descriptors.

The storage format conversion method provided by the embodiment of the present disclosure can further realize a sorting function of column data in a page. Specifically, after parsing the row storage page data to obtain the column descriptors, before calculating the filling information based on the column descriptors, the column descriptors can be sorted first, and the column data in the column storage page can be sorted by sorting the column descriptors.

In the implementation process, the sorting enabling information is acquired first, and then sorting data columns are determined according to the sorting enabling information, wherein the sorting enabling information can be key value information specified by a user, and then the column data corresponding to the key value is the sorting data column, that is, the column data corresponding to the key value is sorted. For example, when the key value information specified by the user is "salary", it means that all salary values in the column data of "salary" are sorted from low to high or from high to low. Further, the sorted column descriptors can be obtained by sorting the column descriptors according to the sorting mode of the sorting data columns. It can be understood that the column descriptors are used to realize calculating the filling information in the column storage pages, and the filling information is used to realize filling the data in the column storage pages. Therefore, the filling information in the column storage pages obtained by calculating the sorted column descriptors must also be sorted filling information, and the column storage page data obtained based on the sorted filling information must also be sorted column storage page data.

Understandably, realization of sorting function can effectively reduce data reading amount and improve data reading efficiency. Specifically, after sorting the column data corresponding to a certain key value, if you want to query target data with the key value within a specified range, you can directly determine a number of column where the target data within the specified range is located, and directly start reading data from this column without starting reading data from the first column, that is, directly skip columns that are not with the specified range, thus effectively reducing the data reading amount and improving the data reading efficiency.

In one embodiment of the present disclosure, the above mentioned coprocessor may include a first preset number of computing units and a first preset number of memories, each computing unit corresponds to a memory, and the above-mentioned acquiring the row storage page data sent by the main processor may include reading to obtain the row storage page data from a memory corresponding to a current computing unit, and the row storage page data is sent to the memory by the main processor.

The embodiment of the present disclosure provides an implementation method for acquiring row storage page data. Specifically, the coprocessor can include the first preset number of computing units and the first preset number of memories, that is, the number of computing units and memories is equal, and one computing unit corresponds to one memory, wherein the memory is used to store the row storage page data sent by the main processor, and the computing unit is used to read the row storage page data from the corresponding memory and perform conversion of row-column on it.

It should be noted that the specific value of the first preset number does not affect the implementation of this technical scheme, and it can be set according to the actual characteristics of the coprocessor, which is not limited in the present disclosure. For example, the first preset number can be set to 16. It can be understood that parallel processing of multiple row storage page data can be realized by setting multiple computing units in the coprocessor, which can greatly improve the storage format conversion efficiency.

In one embodiment of the present disclosure, each computing unit includes a second preset number of execution channels, and the above reading from the memory corresponding to the current computing unit to obtain the row storage page data may include reading from the memory corresponding to the current computing unit to obtain the second preset number of row storage page data.

After reading from the memory corresponding to the current computing unit to obtain the row storage page data, it may further include the step of distributing the second preset number of row storage page data to the second preset number of execution channels, so as to use each execution channel to execute a step of parsing the row storage page data to obtain the column descriptor.

As mentioned above, the coprocessor is provided with the first preset number of computing units for realizing storage format conversion, and further, each computing unit can be provided with the second number of execution channels, and each computing unit can realize storage format conversion by its own execution channels. Therefore, when the current computing unit reads the row storage page data from its corresponding memory, it can directly read the second preset number of row storage page data, so that each row storage page data can be distributed to each execution channel in turn, and each execution channel processes one of the row storage page data.

Similarly, similar to the above-mentioned first preset number, the specific value of the second preset number does not affect the implementation of this technical scheme, and it can be set according to the actual characteristics of the coprocessor, which is not limited in the present disclosure. For example, the value of the second preset number can be set to 8. On the basis of this, a coprocessor is provided with a first preset number of computing units, each computing unit is provided with a second preset number of execution channels, and each execution channel processes one of the storage page data, so that a coprocessor can simultaneously process the first preset number * the second preset number of row storage page data, thereby realizing parallel processing of multiple row storage page data and further improving the storage format conversion efficiency.

In one embodiment of the present disclosure, the above-mentioned feeding back the column storage page data to the main processor may include writing back each column storage page to the memory corresponding to the current computing unit, so that the main processor can read and obtain each column storage page data from each memory.

The embodiment of the present disclosure provides an implementation method for feeding back the column storage page data. As mentioned above, the coprocessor is provided with a first preset number of computing units, and each computing unit corresponds to a memory. When acquiring the row storage page data, the main processor sends the row storage page data that needs to be performed of row-column conversion to the memory for storage, and then the computing unit reads the row storage page data from its corresponding memory for row-column conversion. On the basis of this, after the computing unit completes the row-column conversion operation to obtain the column storage page data, each of the column page storage data can be written back to its corresponding memory for storage, so that the main processor can read and obtain each of the column page storage data from each memory, thus realizing the feedback of the column page storage data.

In an embodiment of the present disclosure, before feeding back the column storage page data to the main processor, it may further include compressing each column field in the column storage page data according to a preset compression algorithm corresponding to each data column to obtain compressed column storage page data.

The storage format conversion method provided by the embodiment of the present disclosure can further realize the compression function of column fields in the column storage page, so as to reduce occupation of storage space. Specifically, after the row-column conversion of storage format is completed to obtain column storage page data, each column field in the column storage page data can be compressed to obtain the compressed column storage page data.

For different types of column fields, different compression methods can be adopted. Therefore, when the column fields are compressed, a preset compression algorithm corresponding to each data column can be adopted. For example, for column fields of character string type, the compression method of Huffman encoding or LZ77 encoding can be adopted; For column fields of floating-point number type, run-length encoding or special floating-point number compression algorithm can be adopted, and for column fields of integer and date type, differential encoding can be used. Understandably, different compression methods can be used for different types of column fields, which can obtain higher compression ratio, thus greatly reducing occupation of storage space.

The embodiment of the present disclosure provides another storage format conversion method.

Figure 3:
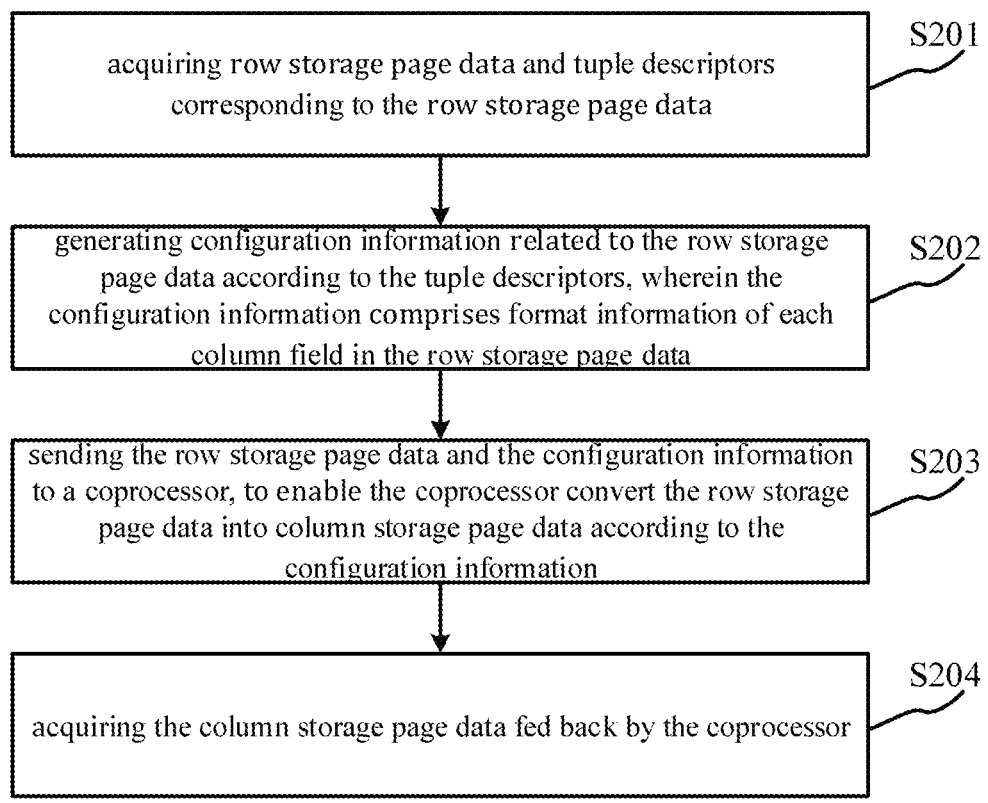
FIG. 3 is a flowchart of another storage format conversion method provided by the present disclosure.

Please refer to FIG. 3, which is a flowchart of another storage format conversion method provided by the present disclosure. The storage format conversion method is applied to the main processor, and may include the following steps of S201 to S204.

S201: acquiring row storage page data and tuple descriptors corresponding to the row storage page data;

S202, generating configuration information related to the row storage page data according to the tuple descriptors, wherein the configuration information includes format information of each column field in the row storage page data;

S203: sending the row storage page data and the configuration information to a coprocessor, to enable the coprocessor convert the row storage page data into column storage page data according to the configuration information;

S204: acquiring the column storage page data fed back by the coprocessor.

The process of converting the row storage page data into the column storage page data by the coprocessor according to the configuration information includes the following steps: parsing the row storage page data according to the configuration information to obtain a column descriptor, wherein the column descriptor includes a first offset address and field length of each column field in the row storage page; calculating and obtaining filling information related to a column storage page according to the column descriptor, wherein the filling information includes a first offset address and column length of each data column in the column storage page, wherein each column field with the same field attribute constitutes a data column; filling the column storage page according to the filling information to generate column storage page data.

The storage format conversion method provided by the embodiment of the present disclosure is applied to the main processor, and the main processor and the coprocessor cooperate to perform storage format conversion, and the specific implementation flow can only refer to the above-mentioned embodiments, so the embodiment of the present disclosure is not repeated here.

It should be noted that the storage format conversion method provided by the embodiment of the present disclosure, combined with the coprocessor to realize the row-column conversion of storage format, can effectively avoid the large consumption of computing power resources of the main processor and ensure high working efficiency.

The embodiment of the present disclosure provides a storage format conversion system.

Figure 1:
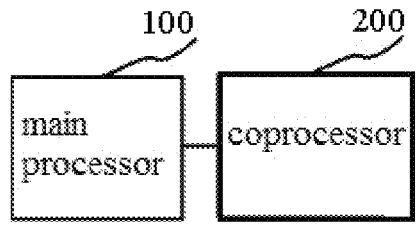
FIG. 1 is a schematic structural diagram of a storage format conversion system provided by the present disclosure.

As shown in FIG. 1, the storage format conversion system may include a main processor 100 and a coprocessor 200, wherein:

the main processor 100 is configured to send row storage page data and configuration information to the coprocessor 200, and acquire column storage page data fed back by the coprocessor 200.

The coprocessor 200 is configured to parse the row storage page data according to the configuration information to obtain a column descriptor, wherein the column descriptor includes a first offset address and field length of each column field in the row storage page; calculate and obtain filling information related to a column storage page according to the column descriptor, wherein the filling information includes a first offset address and column length of each data column in the column storage page, wherein each column field with the same field attribute constitutes a data column; fill the column storage page according to the filling information to generate column storage page data.

It can be seen that the storage format conversion system provided by the embodiment of the present disclosure, combined with the coprocessor, realizes the conversion of row-column storage format, large consumption of computing power resources of the main processor can be effectively avoided, and higher working efficiency can be ensured. Meanwhile, the row storage page data is parsed by combining with configuration information to obtain the offset address and field length of each column field in the row storage page data, and then the first offset address and field length of each data column in the column storage page are calculated, and the column storage page data corresponding to the row storage page data is generated, thus realizing the conversion of the row-column storage format. It can be seen that this implementation method takes the position information and field length of each column field into account, realizes the conversion of the row-column storage format that can support variable-length field data, and effectively improves the applicability of the row-column conversion method.

Figure 4:
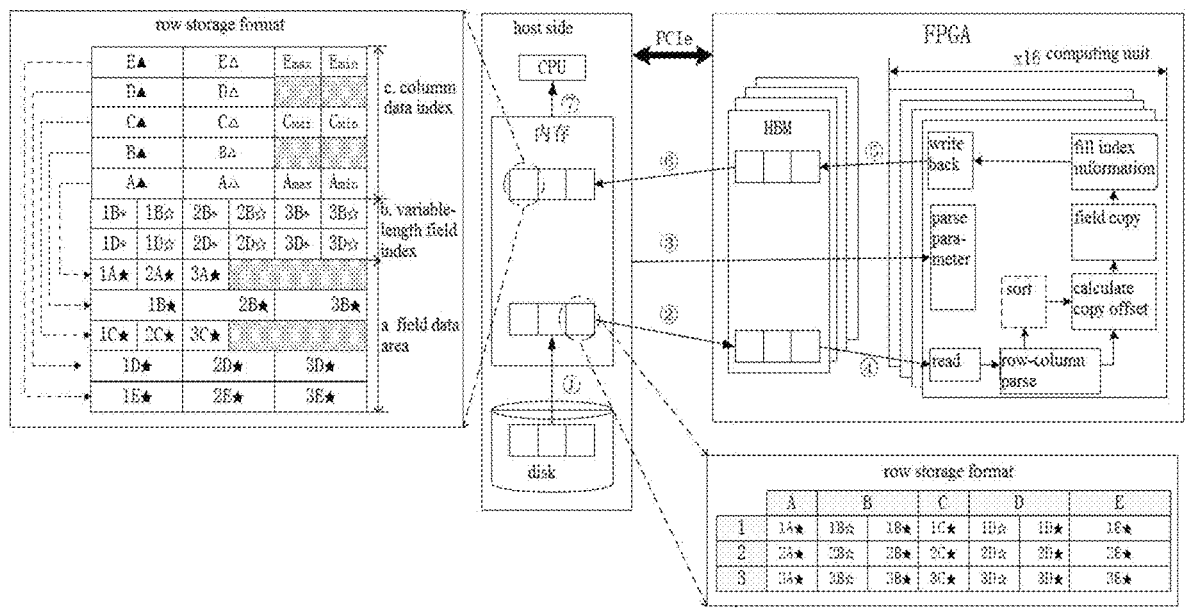
FIG. 4 is a schematic structural diagram of another storage format conversion system provided by the present disclosure.

On the basis of this, please refer to FIG. 4, which is a schematic structural diagram of another storage format conversion system provided by the present disclosure. The main processor is a CPU and the co-processor is a FPGA.

As shown in FIG. 4, a host side of the system is composed of a CPU, a memory and disk. As an acceleration card, the FPGA is connected to a host through PCIe bus. There is a high-speed HBM memory (High Bandwidth Memory, a high-bandwidth memory using memory stacking technology) in the FPGA for storing data to be processed, and a plurality of calculation units are instantiated in it for parallel calculation of data.

Taking a PostgreSQL database as an example, based on the above storage format conversion system, the implementation process of the storage format conversion method can include.

1. The CPU at the host side reads database file data from the disk into the host memory;
2. Send the row storage page data in PostgreSQL to HBM memory of FPGA;
3. Configure the parameters of FPGA;
4. There are many computing units instantiated in FPGA, and each computing unit is used to complete the conversion from row storage format to column storage format;
5. Write back the converted column storage page data to HBM memory of FPGA;
6. The CPU at the host side reads the converted data from the HBM memory of the FPGA into the host memory;
7. The CPU obtains the converted data as a column storage format.

On the first aspect, the format of column storage converted by FPGA is as follows:

(1) The field data of the same column are continuously stored in the field data area (field area);
(2) For the variable-length field data, the offset and length (variable-length field index area) of the variable-length field data in the memory block are represented by a variable-length field index;
(3) Mark the first address offset and length of each data column in the memory block by column data index, and add the maximum value and minimum value of each data column at the same time to optimize data reading (column data index area).

On the second aspect, PostgreSQL database stores data in 8 KB units, and each 8 KB memory block is called a page, that is, a row storage page data. Please refer to FIG. 5, which is a schematic diagram of a storage format for row storage page data provided by the present disclosure, and its storage rules are as follows:

(1) a page stores several rows of data, and a fixed position of the page marks the number of rows stored in the page;
(2) each row of data is encapsulated into a tuple, and the data of each field (including variable-length fields and fixed-length fields) are stored in the tuple in turn except header information;
(3) Starting from a fixed offset position of the page, store meta information of the tuple towards a bottom direction of the page, wherein the meta information includes the offset and length of the tuple;
(4) Starting from the bottom of the page, the tuples are sequentially stored in a top direction of the page.

Each row of tuples includes one or more column fields, and the column fields have two types of fixed-length and variable-length. When creating a data table, PostgreSQL will create a corresponding tuple descriptor (corresponding to the tupDesc data structure in the source code) to describe the field length, field alignment, field type and other information of each column in the table. In the tuple descriptor:

(1)attlen field, indicating the field length of this column:
for fixed-length fields: attlen field in tuple descriptor is greater than 0, indicating the length of corresponding column field.
for variable-length data: the attlen field in the tuple descriptor is equal to −1, indicating that the corresponding column field is a variable-length field. The length information of the variable-length field is placed at the head of the column data, and the value is shifted to the right by one bit and then minus one, which is the column length.

(2)attalign field, indicating the field alignment of this column:
there are four possible alignment modes of column fields: 1, 2, 4 and 8. The storage address of column data needs to be aligned according to this alignment mode.

(3)atttype field, indicating the field type of this column:
common types are: integer, floating point number, string, date, etc. (numerical values correspond to src/backend/catalog/pg_type_d.h in the source code).

(4)natts field, indicating how many column fields there are in the tuple.

On the third aspect, it can support hardware acceleration of parsing the native format of PostgreSQL, and the logic of parsing the native format is completed by hardware. Therefore, it is only necessary to read the database file from the disk, and the file content can be divided into blocks and transferred to the HBM memory of FPGA.

On the fourth aspect, configure the parameters of FPGA: the parameter configuration of FPGA is designed to tell the format of each column field in the tuple in the row storage page of FPGA. Wherein, the configuration parameters are converted from PostgreSQL tuple descriptors, and a continuous code stream can be formed by extracting fields required for parsing tuples by hardware. The format of the code stream is shown in FIG. 6, which is a schematic diagram of the format of a configuration parameter code stream provided by the present disclosure, wherein the first four bytes of the code stream indicate a number of column fields in the tuple, and the next four bytes store an index number of the sorted column (the index number is equal to −1 when sorting is not needed), and then sequentially store the field type, field length and field alignment of each column.

Figures 6, 7, 8:
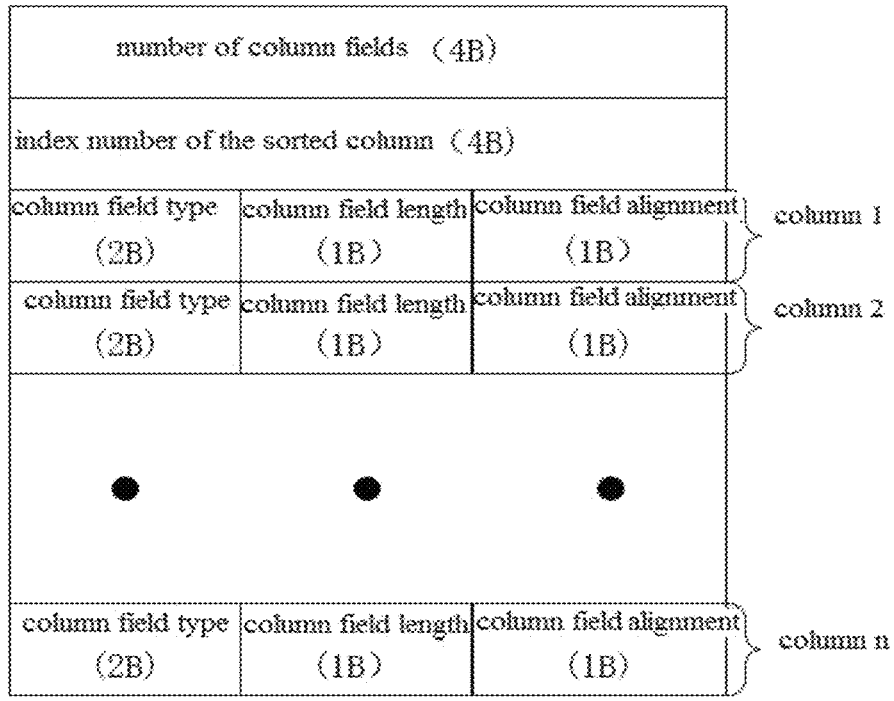
FIG. 6 is a schematic diagram of a format of a configuration parameter code stream provided by the present disclosure.
FIG. 7 is a schematic diagram of a data table corresponding to row storage page data provided by the present disclosure.
FIG. 8 is a schematic diagram of a tuple descriptor provided by the present disclosure.

Based on the above four aspects, the following provides an example:

for example, create a record as shown in FIG. 7, and FIG. 7 is a schematic diagram of a data table corresponding to row storage page data provided by the present disclosure, and the data table has five rows of records. Wherein, the ID and Age columns are integers (INT4), the Name and Position columns are strings (VARCHAR), and the Salary column is a floating point number (FLOAT8). The field type (atttype) corresponding to each column field is defined as follows in the source code: src/backend/catalog/pg_type_d.h:

define INT4OID 23;
define VARCHAROID 1043;
define FLOAT8OID 701.

Further, in the tuple descriptor generated by PostgreSQL database, the natts field is equal to 5, and the atttype, attalign and attlen fields are shown in FIG. 8, which is a schematic diagram of a tuple descriptor provided by the present disclosure, and the parsing parameter code stream generated according to this tuple descriptor is shown in FIG. 9, which is a schematic diagram of a configuration parameter code stream provided by the present disclosure, wherein columns 1, 3 and 5 are of fixed-length type and can be used for sorting. If the sorting is not needed, then the sorted index number is filled with −1.

Figure 5:
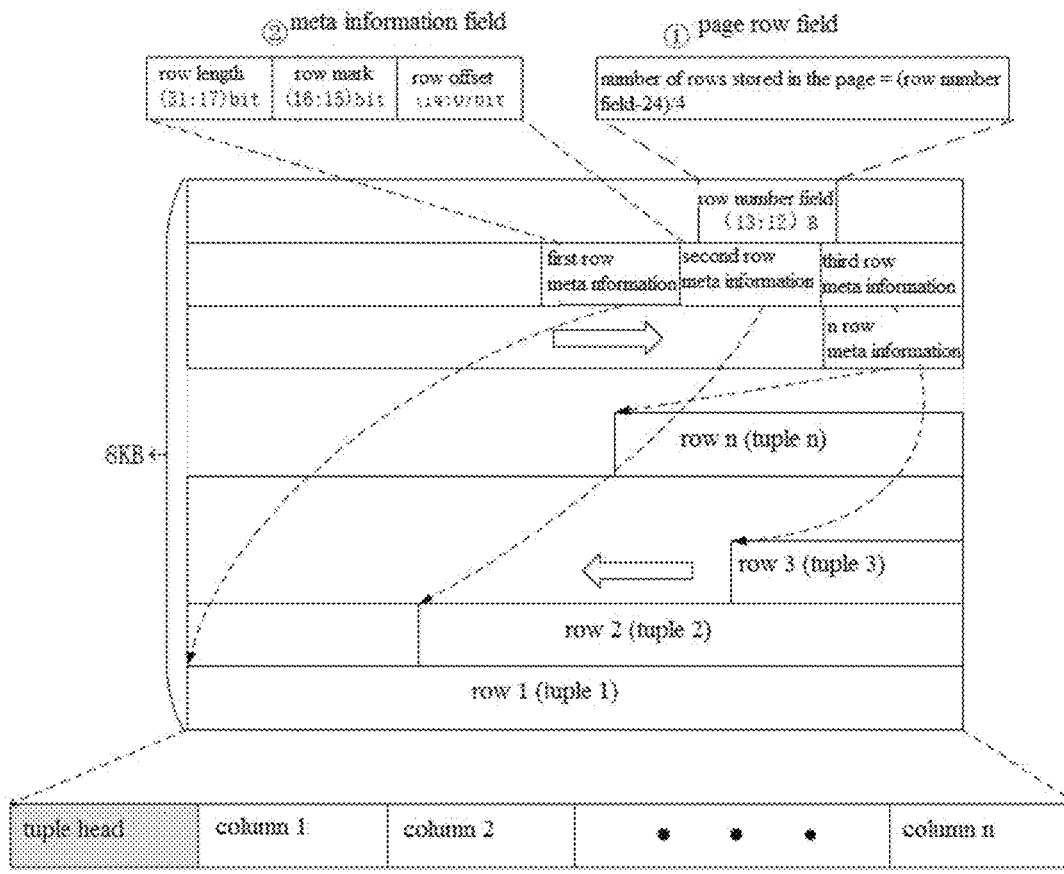
FIG. 5 is a schematic diagram of a storage format of row storage page data provided by the present disclosure.
Figure 10:
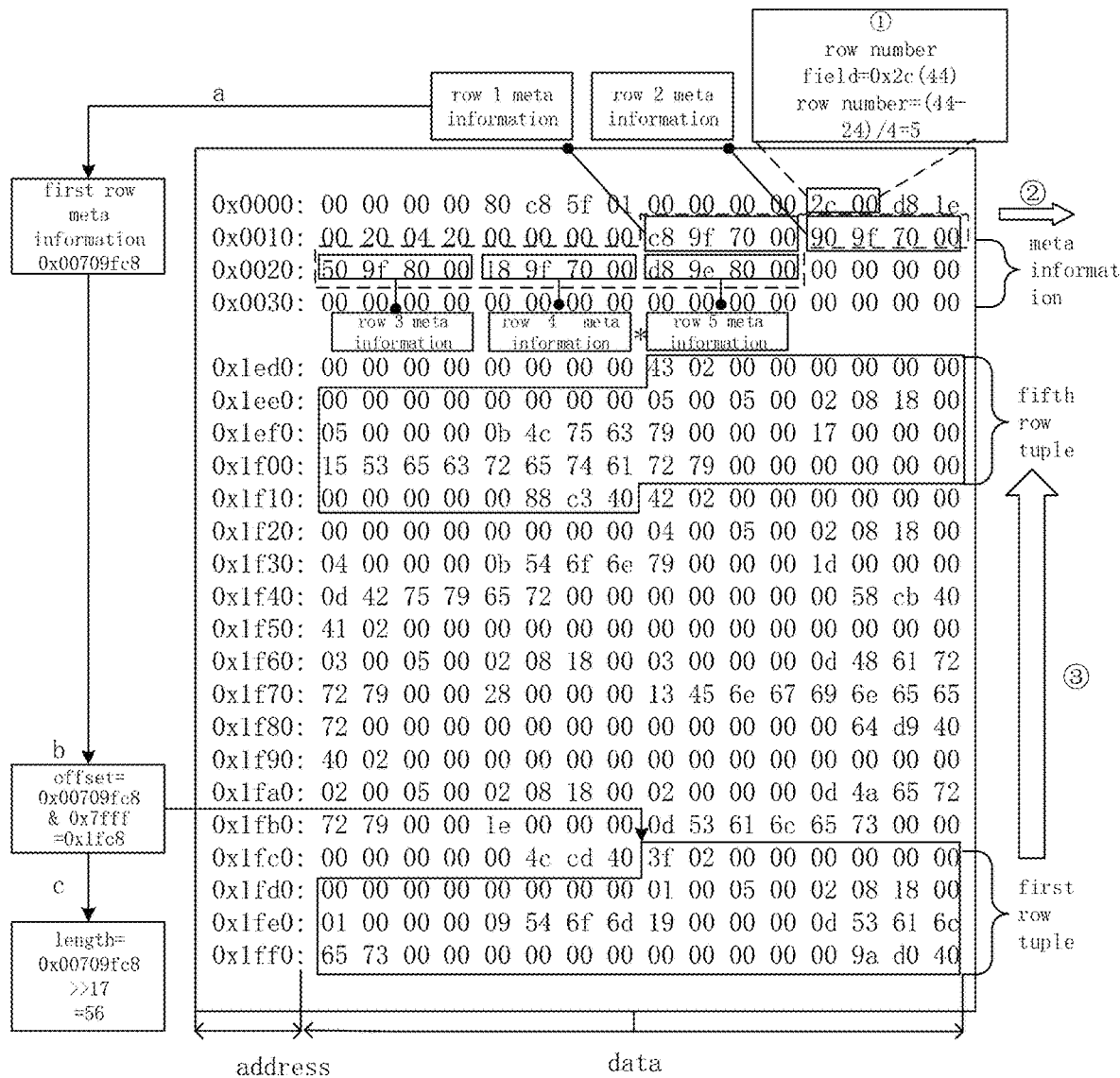
FIG. 10 is a schematic diagram of row storage page data provided by the present disclosure.

Suppose that in PostgreSQL, the stored data in a page is as shown in FIG. 10, which is a schematic diagram of a row storage page data provided by the present disclosure, and its parsing process is as follows:

(1) the 12th-13th byte of the page indicates the number of rows stored in the page, and it can be concluded that the number of rows is 5 according to the parsing rule shown in FIG. 5;

(2) starting from the 24th byte offset, the page sequentially stores the meta information of each row toward the bottom direction of the page;

(3) from the bottom of the page to the top, the data of each row is stored in turn, and the data is encapsulated in the form of tuples.

Take a parsing of a first tuple position as an example:

(1) the meta information value is 0x709fc8;
(2) 0-14 bits in the meta information represent the offset of the corresponding tuple in the page, and the tuple offset can be calculated as 0x1fc8;
(3) 17-32 bits in the meta information represent the length of the corresponding tuple, and the original value of the tuple length can be calculated as 56.

Figures 11, 12:
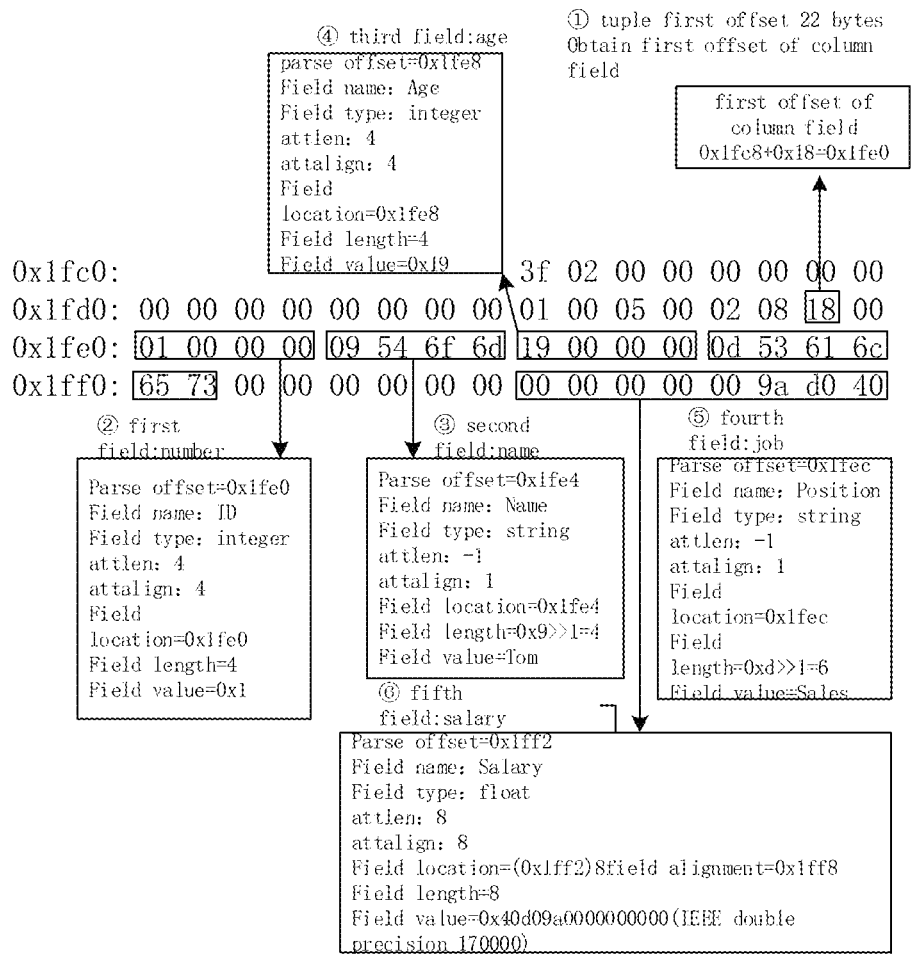
FIG. 11 is a schematic diagram of a column field parsing principle provided by the present disclosure.
FIG. 12 is a schematic diagram of another tuple descriptor provided by the present disclosure.

The parsing process of the first tuple and each column field can be shown in FIG. 11, which is a schematic diagram of the parsing principle of the column field provided by the present disclosure. The parsing process is as follows: firstly, at a tuple offset of 22 bytes, an offset position of the column field in the tuple is marked as 0x18, and the offset address of the first column is calculated as 0x1fe0; Then, a position of each field in the tuple is parsed according to attlen and attalign, and a meaning of each field is parsed according to atttype.

On the fifth aspect, the format rules of row-column conversion have the following features:

(1) in order to support the efficient reading operation of column fields, a variable-length field index area is added to the converted column storage format, and the variable-length field index includes the offset position and field length of each variable-length column field in the memory block;

(2) adding the column data index area in the converted storage format, and in the column data index, identifying the first address of each data column in the memory after row-column conversion with a fixed length of 4B;

(3) in the process of row-column conversion, recording the maximum and minimum values in a column data (except for variable-length data columns), and store the minimum and maximum values as the limit values of the column in the column data index; on the basis of this, when the database conducts an OLAP query, and finds that a limit value of a column does not meet a filtering condition, reading of the memory block is directly skipped, thus reducing data reading and calculation operations;

(4) different column fields may have alignment requirements; between two adjacent columns of data, data alignment of column fields in memory is ensured by filling data.

On the basis of this, the operation steps to realize the row-column format conversion are as follows.

Figures 13, 14:
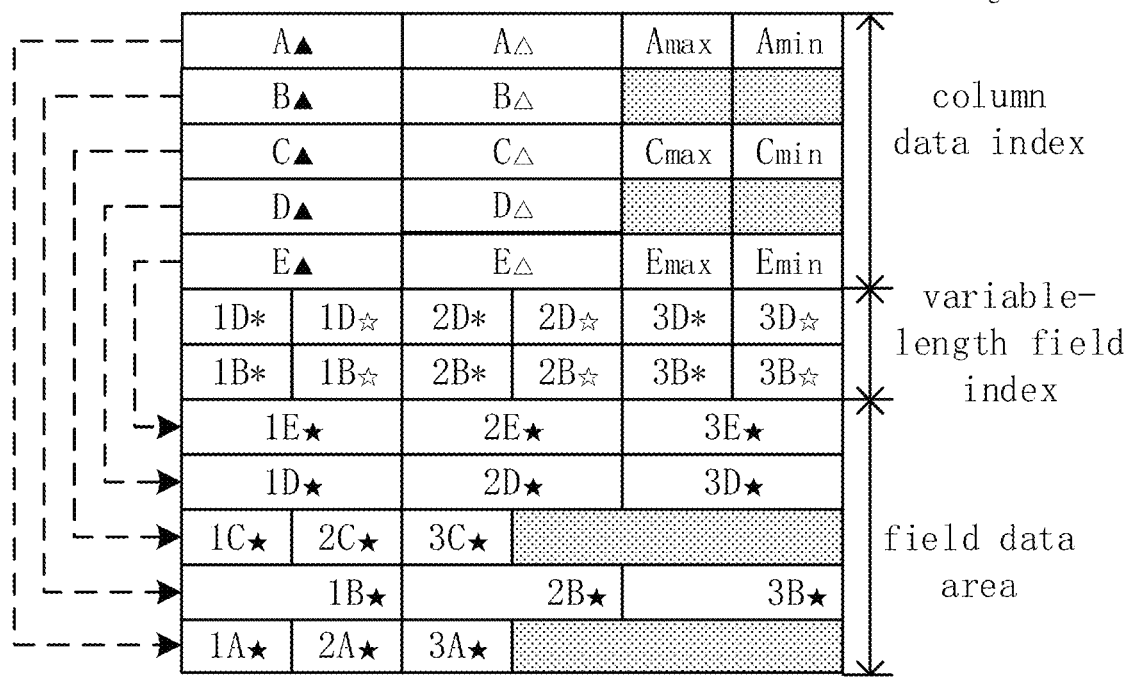
FIG. 13 is a schematic diagram of storage of tuple descriptors shown in FIG. 12 in PostgreSQL database.
FIG. 14 is a schematic diagram of a storage format of column storage page data provided by the present disclosure.

Suppose there are five fields, A, B, C, D and E, in a data table. When the data table is created, the information of each tuple descriptor is shown in FIG. 12, which is a schematic diagram of another tuple descriptor provided by the present disclosure, and its storage mode in PostgreSQL database is shown in FIG. 13, which is a schematic diagram of the storage of the tuple descriptor shown in FIG. 12 in PostgreSQL database. Wherein the data of each field is continuously stored in memory. For the fixed-length field, directly store the data of this field, as shown by ★ in FIG. 13. For the variable-length field, in addition to the content of the variable-length field itself, the length value of the field will be stored in the head of the variable-length field, as shown by ☆ in FIG. 13.

After the row storage page corresponding to the tuple descriptor shown in FIG. 13 is subjected to row-column format conversion, the obtained storage format of column storage page data is as shown in FIG. 14, which is a schematic diagram of the storage format of column storage page data provided by the present disclosure, wherein:

(1) the data contents of fixed-length fields and variable-length fields (as shown by ★ in FIG. 14) are continuously stored in the field data area, including: 1A★, 2A★, 3A★, 1B★, 2B★, 3B★, 1C★, 2C★, 3C★, 1D★, 2D★, 3D★, 1E★,2E★ and 3E★. Use filling data to ensure alignment of column data;

(2) the offset of the data content of the variable-length field in the memory (as shown by * in FIG. 14) and the length of the data content of the variable-length field (as shown by ☆ in FIG. 14) are continuously stored in the variable-length field index, including 1B*, 1B☆, 2B*, 2B☆, 3B*, 3B☆, 1D*, 2D*, 2D☆, 3D* and 3D☆;

(3) the offset (as shown by ▲ in FIG. 14) and length (as shown by Δ in FIG. 14) of each data column after conversion are stored in the column data index, including: A▲, A Δ; B▲, BΔ; C▲, CΔ; D▲, DΔ; E▲, EΔ;

(4) corresponding to a fixed-length data column, the maximum and minimum values in the data column will be recorded in the conversion process and stored in the column data index, including Amax, Amin; Cmax, Cmin; Emax, Emin, variable-length data columns do not calculate the maximum and minimum values, but use filling data for alignment filling.

Based on the fifth aspect above, the following provides an example.

Figure 15:
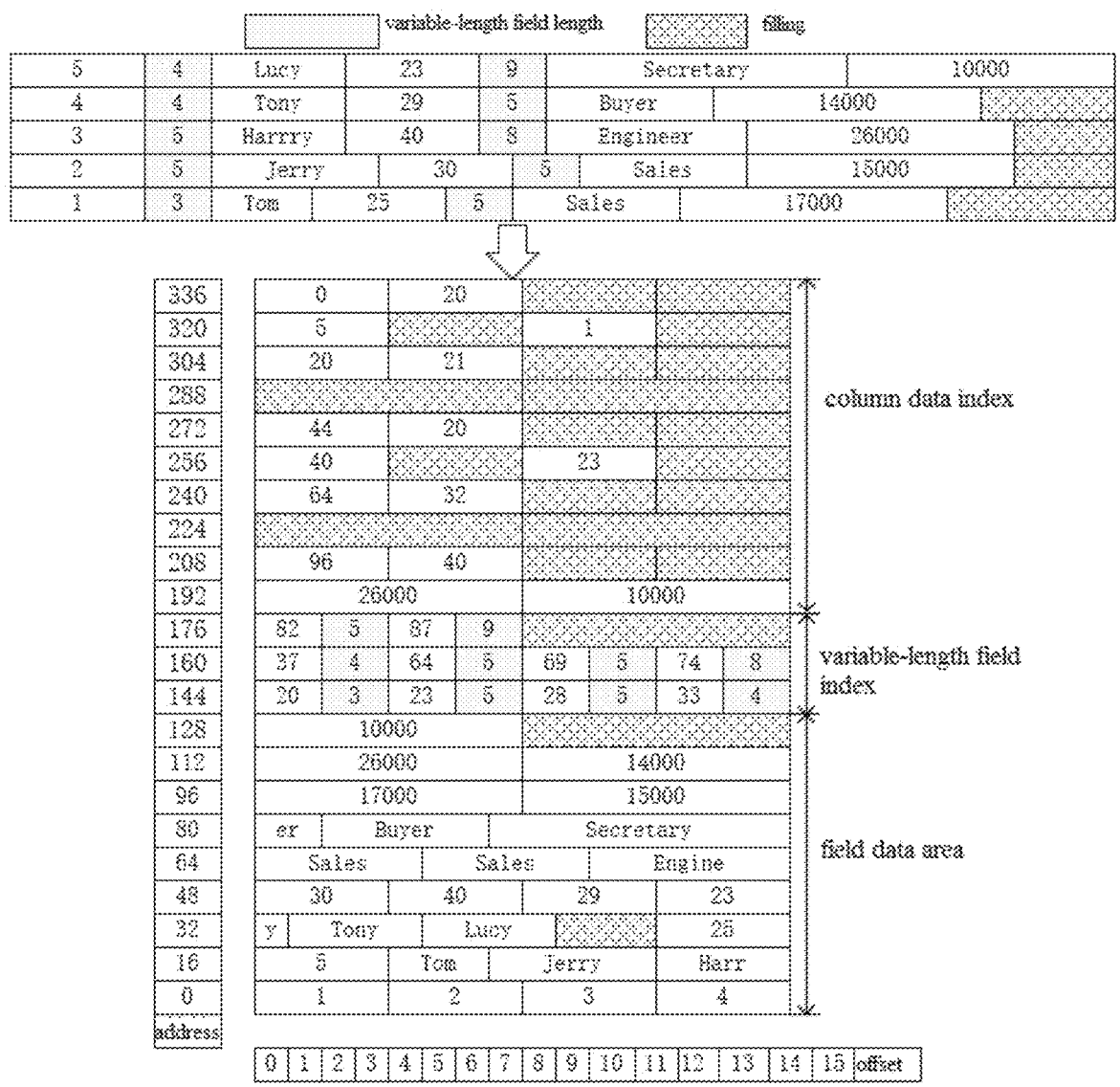
FIG. 15 is a schematic diagram of sort-disabled column storage page data provided by the present disclosure.
Figure 16:
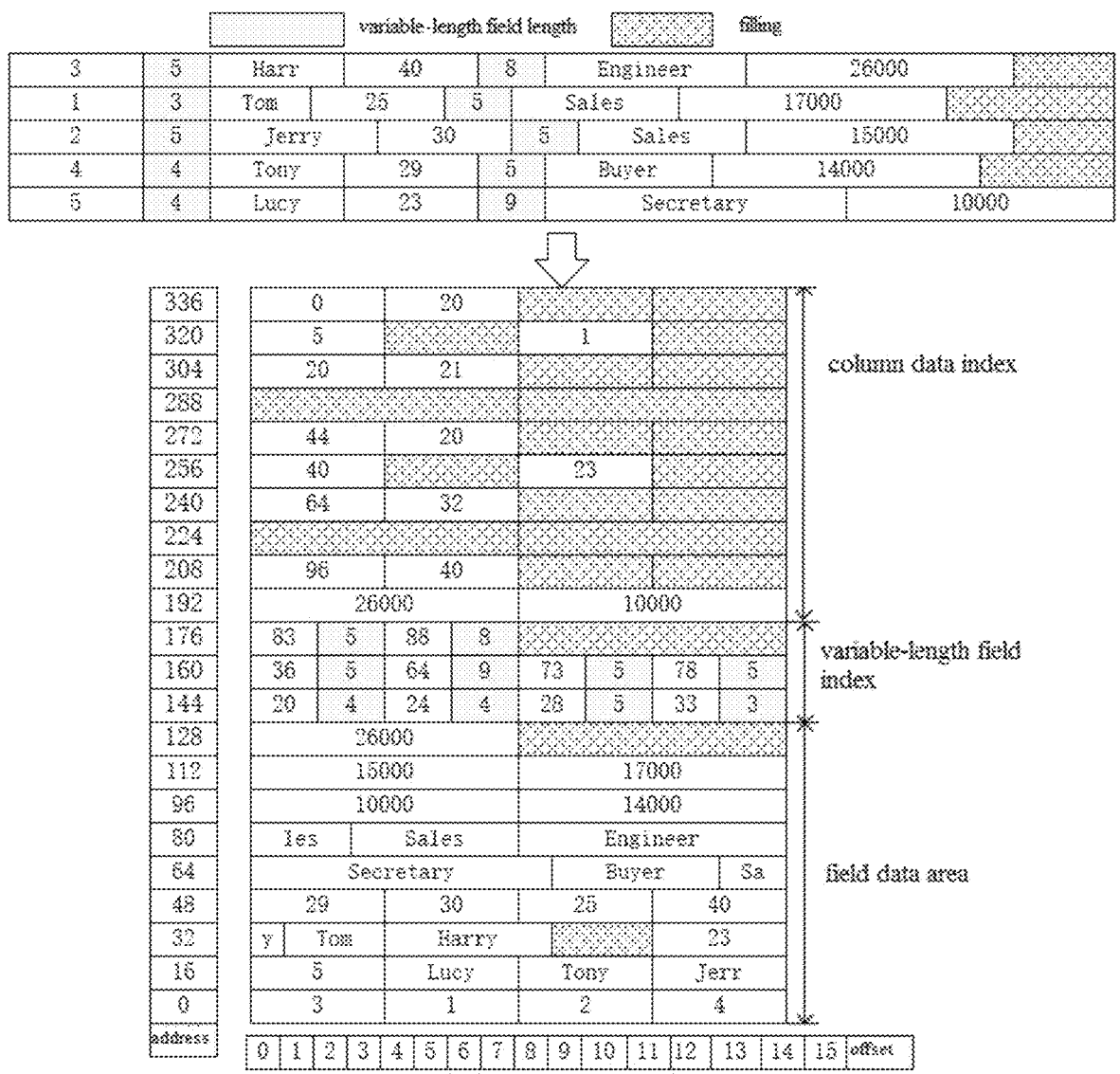
FIG. 16 is a schematic diagram of sort-enabled column storage page data provided by the present disclosure.

Take the data table shown in FIG. 7 as an example. If sorting is not enabled, it will be converted to column storage mode, as shown in FIG. 15, and if sorting is based on Salary, it will be converted to column storage mode, as shown in FIG. 16. Wherein, FIG. 15 is a schematic diagram of column storage page data unable to sort provided by the present disclosure, and FIG. 16 is a schematic diagram of column storage page data enable to sort provided by the present disclosure.

On the sixth aspect, the internal design and workflow of the FPGA:

the FPGA is good at parallel and pipelined computing. For fixed algorithms, using special hardware circuits can greatly improve the operation efficiency. The design of FPGA has the following features:

(1) 16 computing units are instantiated in FPGA, each computing unit is allocated an independent HBM memory, and all computing units parse PostgreSQL page data in parallel to complete a conversion from row storage to column storage;

(2) row-column conversion is performed based on a PostgreSQL page, and the row-column parsing module parses according to the storage format of PostgreSQL pages to parse out the position and length of each column field in the page, and the parsing result is encapsulated as a column descriptor structure. The row-column parsing module can read eight pages at a time and submit them to eight internal execution channels for parallel parsing;

(3) after the column descriptors are parsed, the user can select a column as a primary key and sort the column descriptors according to the values of the primary key. After the sorting function is enabled, the corresponding row data will be performed row-column conversion according to the results sorted by the primary key;

(4) in the process of row-column parsing, the total length of each column data, the maximum value and the minimum value of each column data are counted, wherein the column length statistical information is used to calculate the offset of each data column in the column storage page; The maximum and minimum values of column data are used to fill the column data index;

(5) inside each computing unit, eight execution channels are instantiated, and each channel parses a page to match the processing speed of the reading module and the write-back module. Each execution channel can include a row-column parsing module, a sorting module, a copy and offset calculation module, a field copy module and a filling index module;

(6) ping-pong cache is used between each module to realize pipelining between modules.

Figure 17:
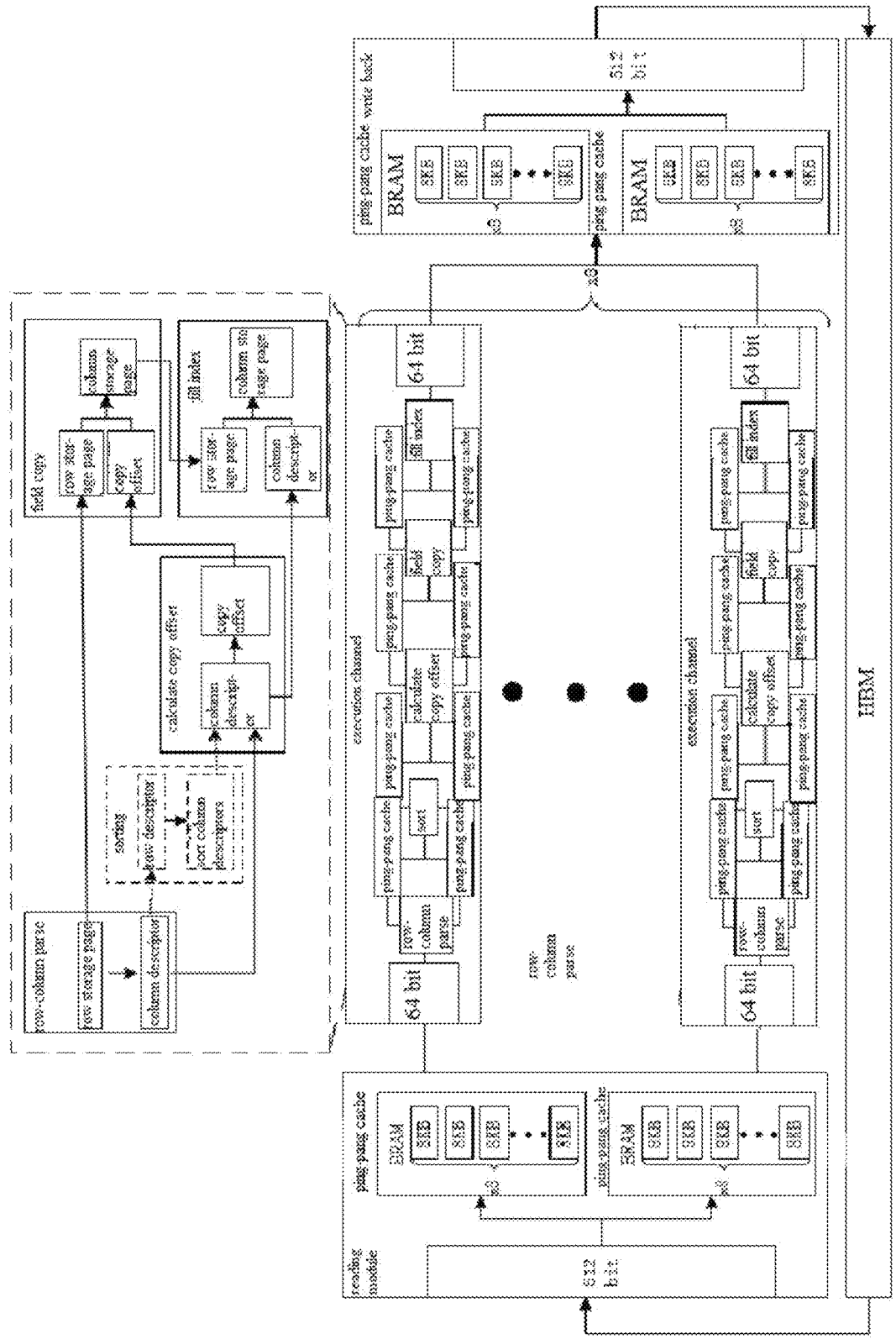
FIG. 17 is a schematic structural diagram of a computing unit in an FPGA provided by the present disclosure.
Figure 18:
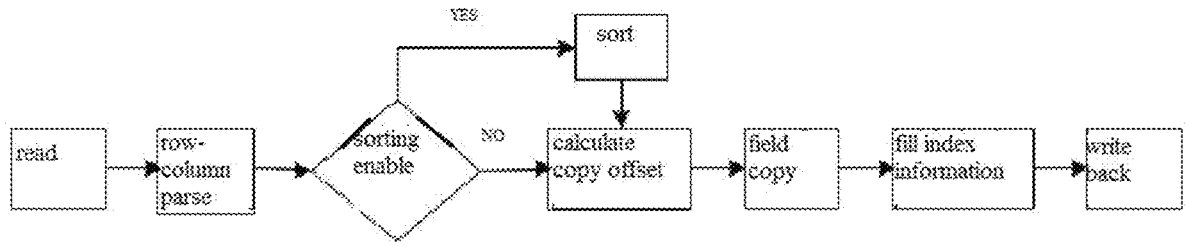
FIG. 18 is a schematic work flow diagram of a computing unit in an FPGA provided by the present disclosure.

Based on the above design features, please refer to FIG. 17, which is a schematic structural diagram of a computing unit in an FPGA provided by the present disclosure. Each computing unit in the FPGA includes seven modules: reading, row-column parsing, sorting, calculating copy offset, field copying, filling index, and writing back. Ping-pong cache is used among the modules to realize running of pipelining, wherein the sorting module is optional, and the workflow between modules is shown in FIG. 18, which is a schematic work flow diagram of a computing unit in an FPGA provided by the present disclosure.

(1) Reading Module the reading module is configured to read data from an external HBM memory to an internal RAM cache. The data reading uses 512-bit width, and reads 8 pages at a time, with a total of 64 KB of data, which is transmitted to the row-column parsing module by the ping-pong cache.

Figure 19:
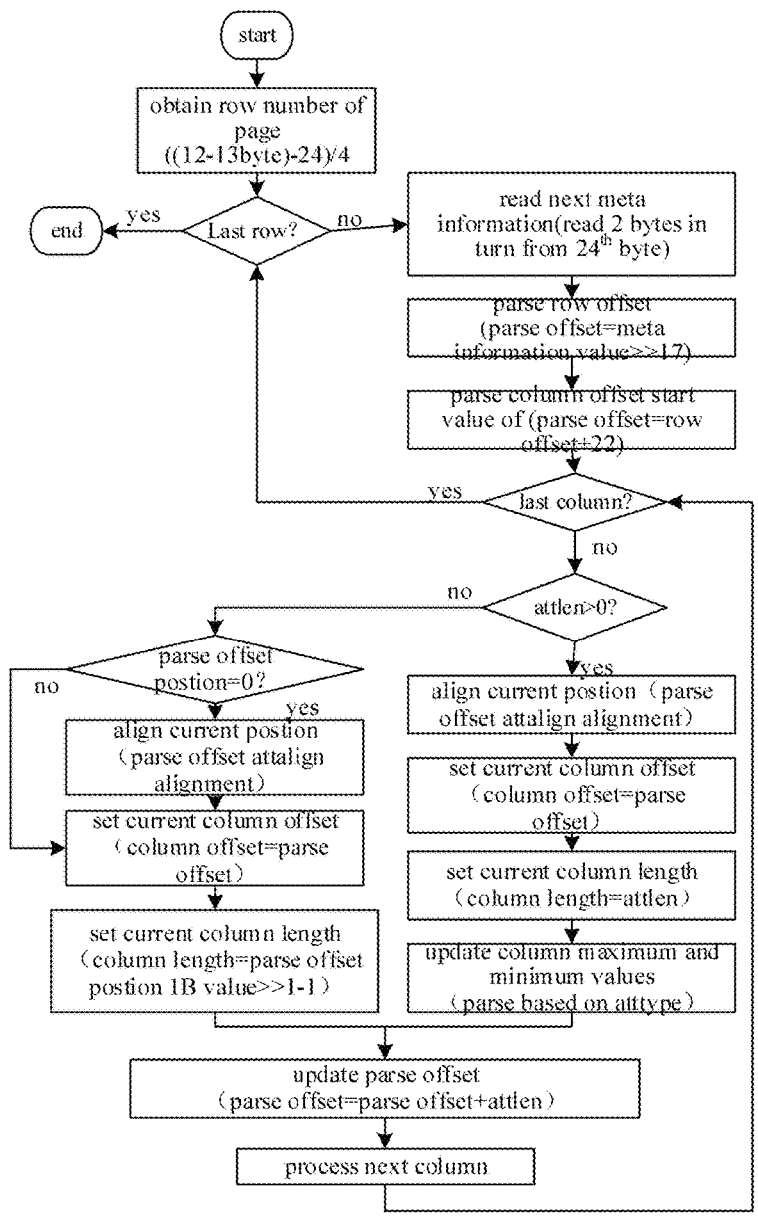
FIG. 19 is a schematic work flow diagram of an execution channel provided by the present disclosure.

(2) Row-column Parsing Module the row-column parsing module is configured to acquire page data from the reading module, and acquire 8 pages at a time. 8 execution channels are instantiated inside each computing unit, and each channel reads page data with a bit width of 64 bits, and parses the offset and length of each column in the page in parallel according to the configuration parameters. Moreover, the output result of each channel is a column descriptor, which contains the position and field length of each column data in the page, and the maximum and minimum values of fixed-length data. The workflow of each execution channel is shown in FIG. 19, which is a schematic diagram of the workflow of an execution channel provided by the present disclosure.

Figure 20:
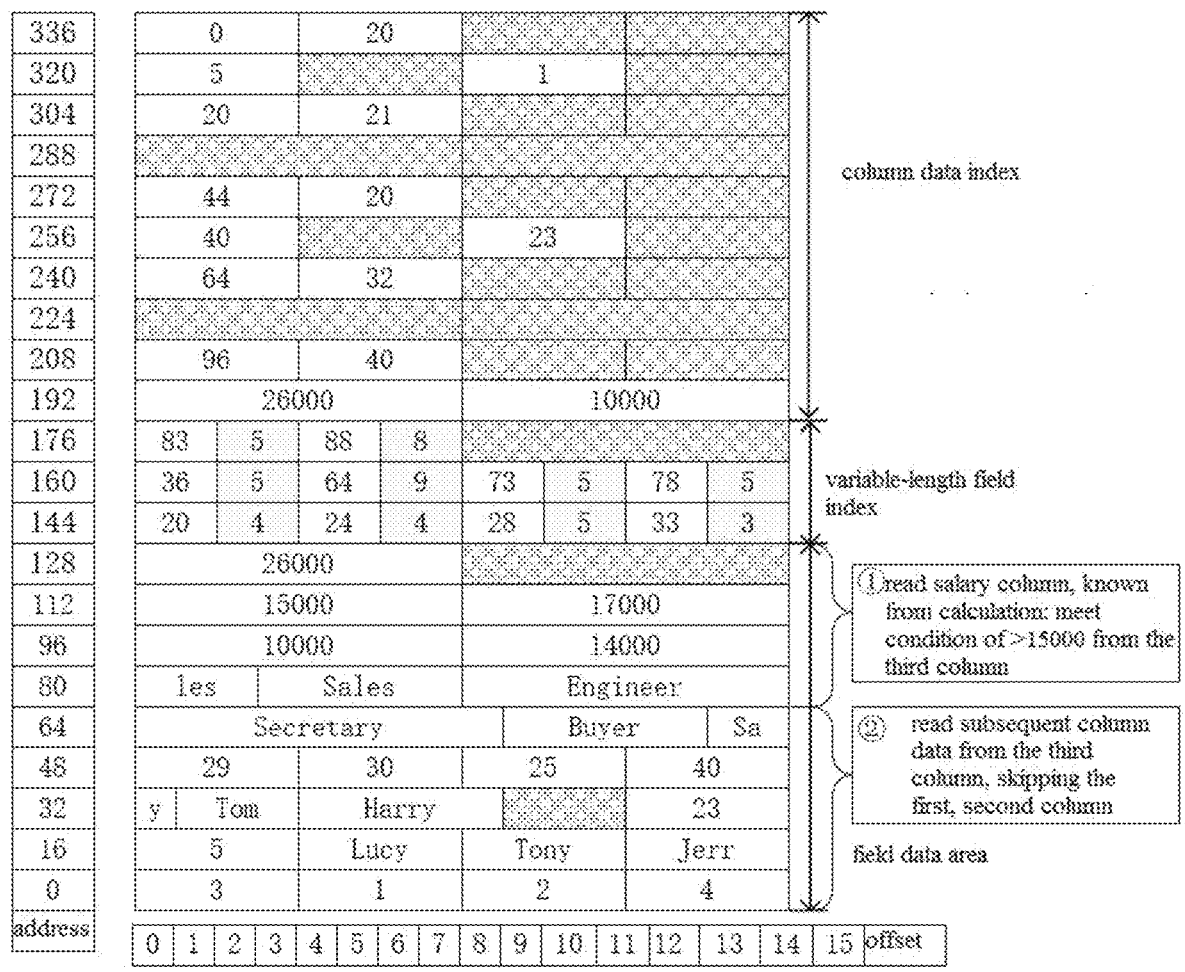
FIG. 20 is a schematic diagram of another sort-enabled column storage page provided by the present disclosure.

(3) Sorting Module the sorting module, which is an optional function, sorts the column descriptors according to the columns corresponding to an index number when the index number of the columns configured by the parsing parameters is greater than 0, and after data in the page is sorted, it can be used to optimize the data reading operation in OLAP query business. For example, as shown in FIG. 20, which is a schematic diagram of another sort-enabled column storage page provided by the present disclosure, the sort-enabled column storage page is sorted by salary, and when OLAP query is conducted to obtain employee information with salary greater than 15,000, the following optimized reading method can be adopted:

① read the salary column, and after calculation, it is known that the conditions are met from the third column;

② because the column data are arranged in an orderly manner, the subsequent column data are read directly from the third column in the column data, skipping the first and second column data, thus reducing the reading amount of data. When the data volume is larger, the optimization effect is more obvious.

(4) Copy Offset Calculation Module
- the copy offset calculation module completes the offset calculation of each area in each column storage page according to the parsed column descriptors, and the workflow is as follows:
  - ① according to the field length of each column field, count the total length of each data column:
  - traverse the column fields and accumulate to obtain the total length of the column fields.
  - ② according to the total length of each data column and the alignment of column fields, the offset of each column field in the field data area is allocated, and the maximum and minimum values are recorded;
  - Step 1: an initial offset value is 0;
  - Step 2: align the offset value according to a field alignment value;
  - Step 3: accumulate the total length of each data column and update the maximum and minimum values;
  - Step 4: exit the last column, otherwise jump to Step 2.
  - ③ calculate the offset and length of variable-length field index in the page.
  - Step 1: start from the end of the field data area, align according to the corresponding field, and use it as the offset of the variable-length field index in the page;
  - Step 2: each variable-length field occupies 4 bytes, and the offset and length use 2 bytes respectively;
  - Step 3: count the total length of the variable-length fields and calculate the end address of the variable-length field index area.
  - ④ calculate the offset and length of column data index.
  - Step 1: the ending address of the variable-length field index area is aligned according to 8 bytes, and then is used as a starting offset of the column index;
  - Step 2: each column index occupies 32 bytes, the maximum value and the minimum value occupy 8 bytes each, the column offset and length occupy 2 bytes each, and the rest are aligned with filling.

(5) Field Copy Module
- the field copying module, which copies each column field to the corresponding position in turn according to the column descriptor and the copy offset in (4) to complete the copying of the field data area in the column storage mode; Moreover, in the process of copying, the offset field in the column descriptor is updated to the position in the column storage page.

(6) Filling the Index Information Module
- the index information filling module fills the variable-length field index and the column data index according to the copy offset in (4) and the updated column descriptor.

(7) Write-Back Module
- the write-back module, writes the converted page storage data back to HBM memory, wherein the data write-back uses 512 bit width.

Figure 21:
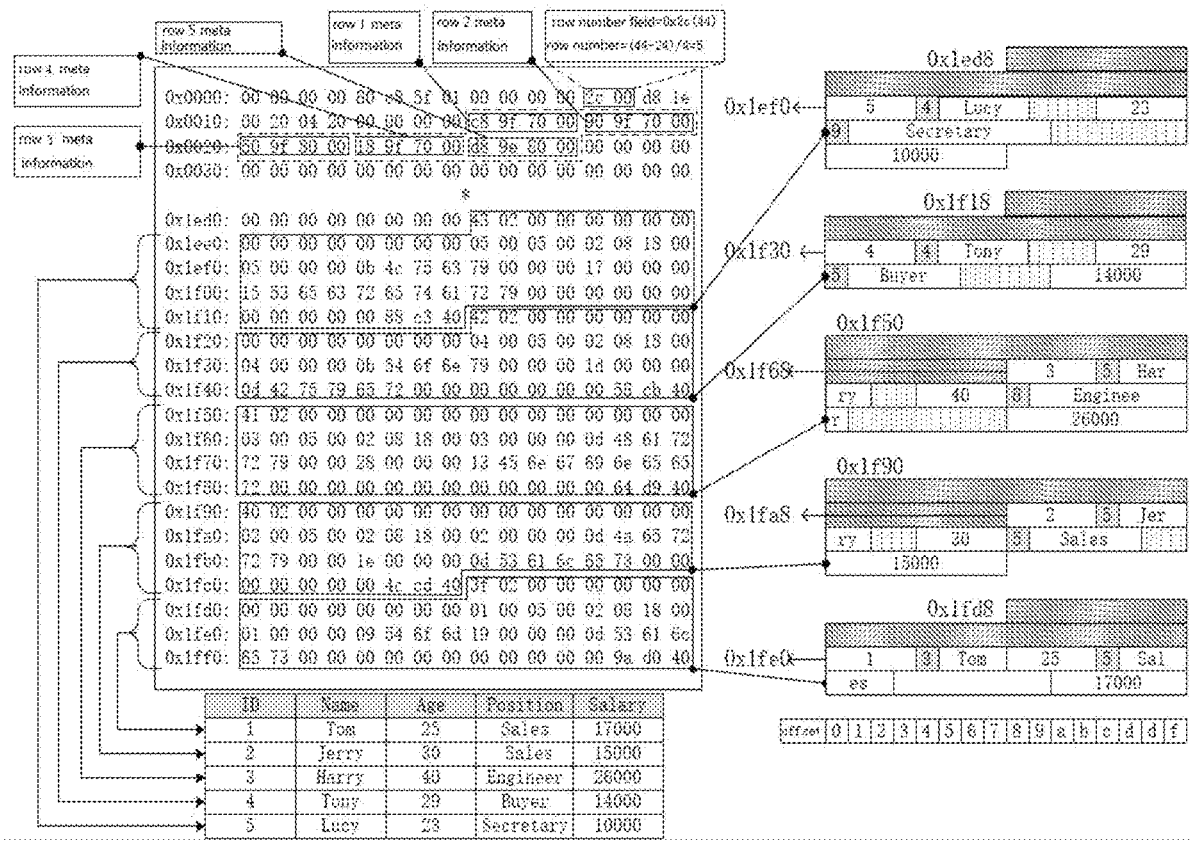
FIG. 21 is a schematic diagram of another row storage page data provided by the present disclosure.
Figure 22:
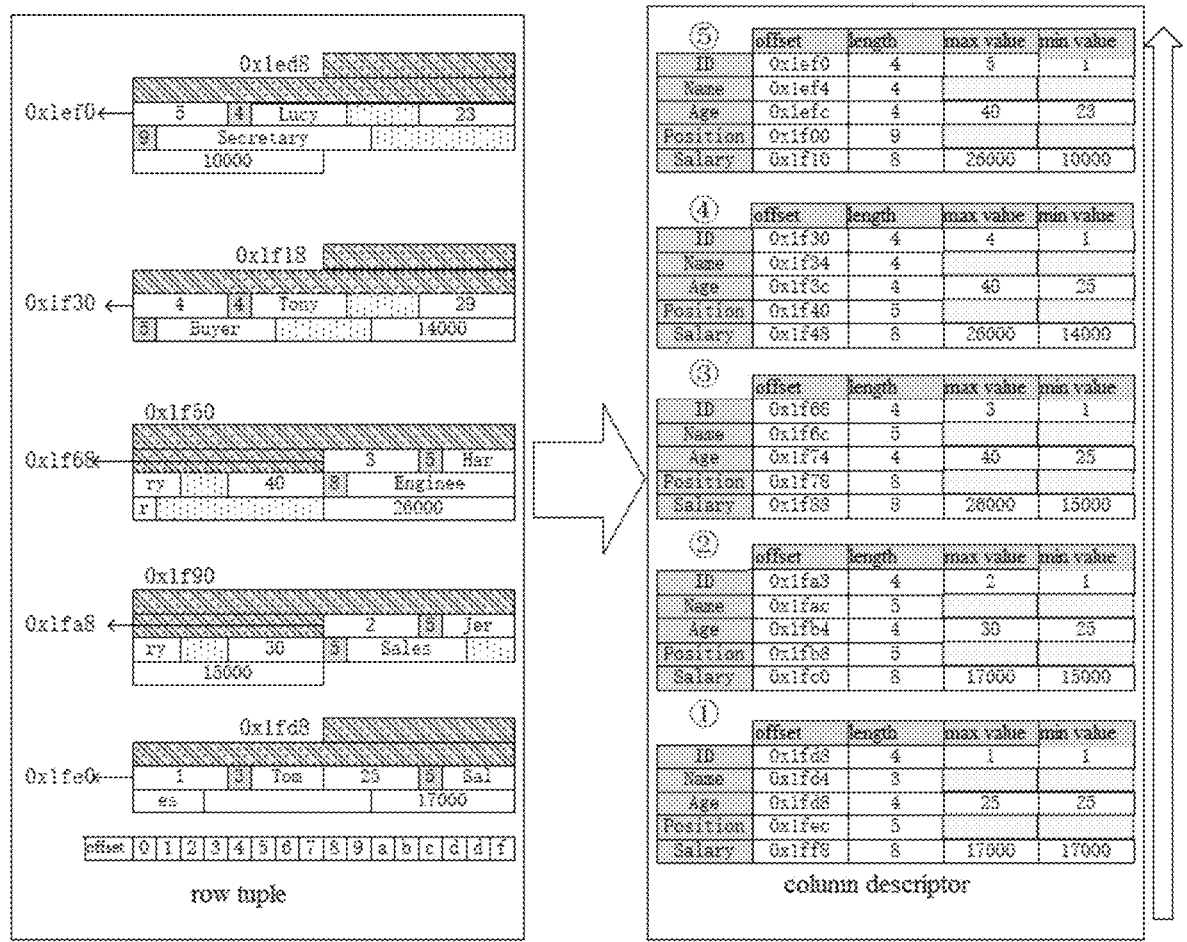
FIG. 22 is a schematic diagram of a generation principle of a column descriptor provided by the present disclosure.
Figure 23:
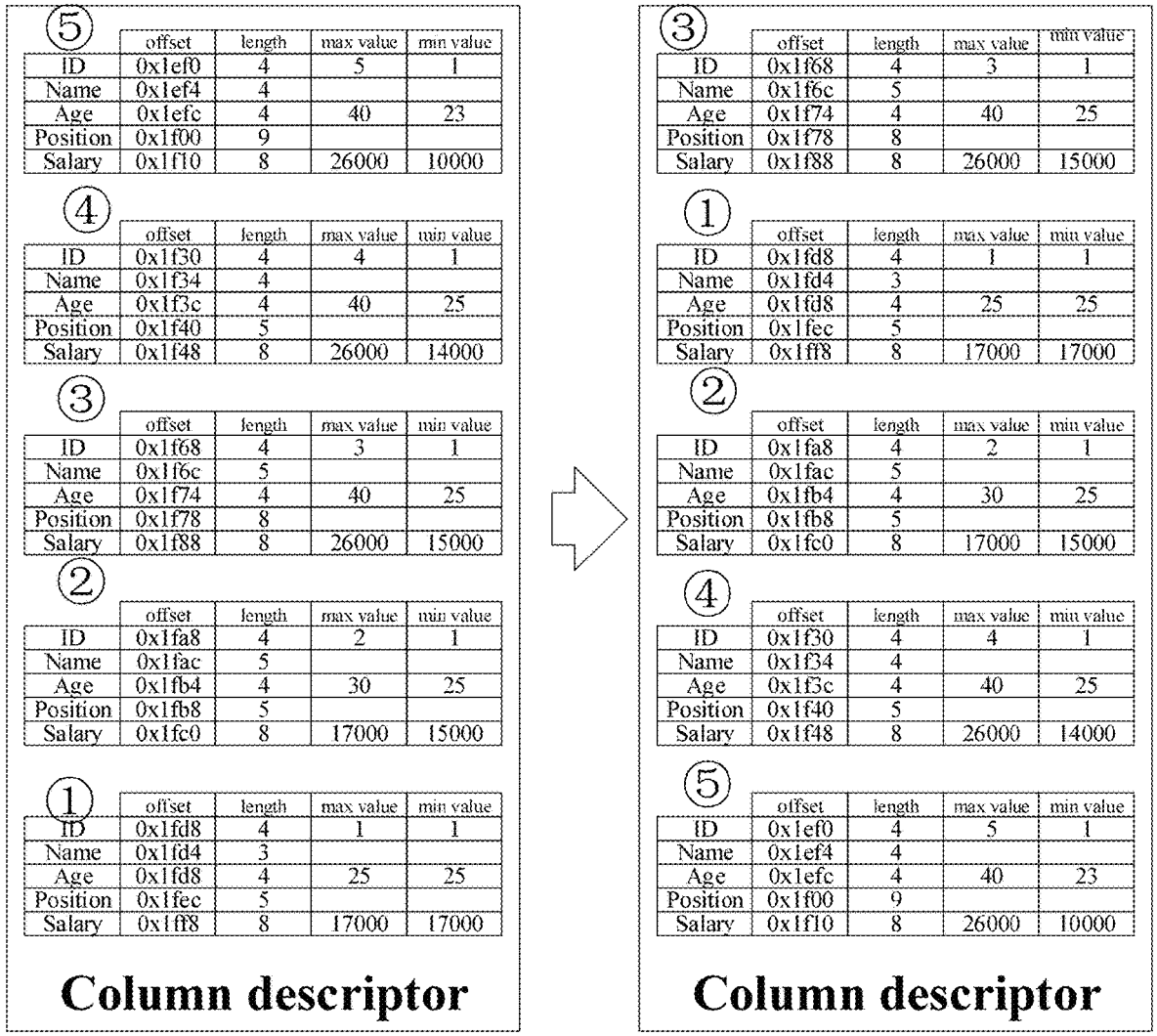
FIG. 23 is a schematic diagram of a sorting principle of a column descriptor provided by the present disclosure.
Figures 24, 25:
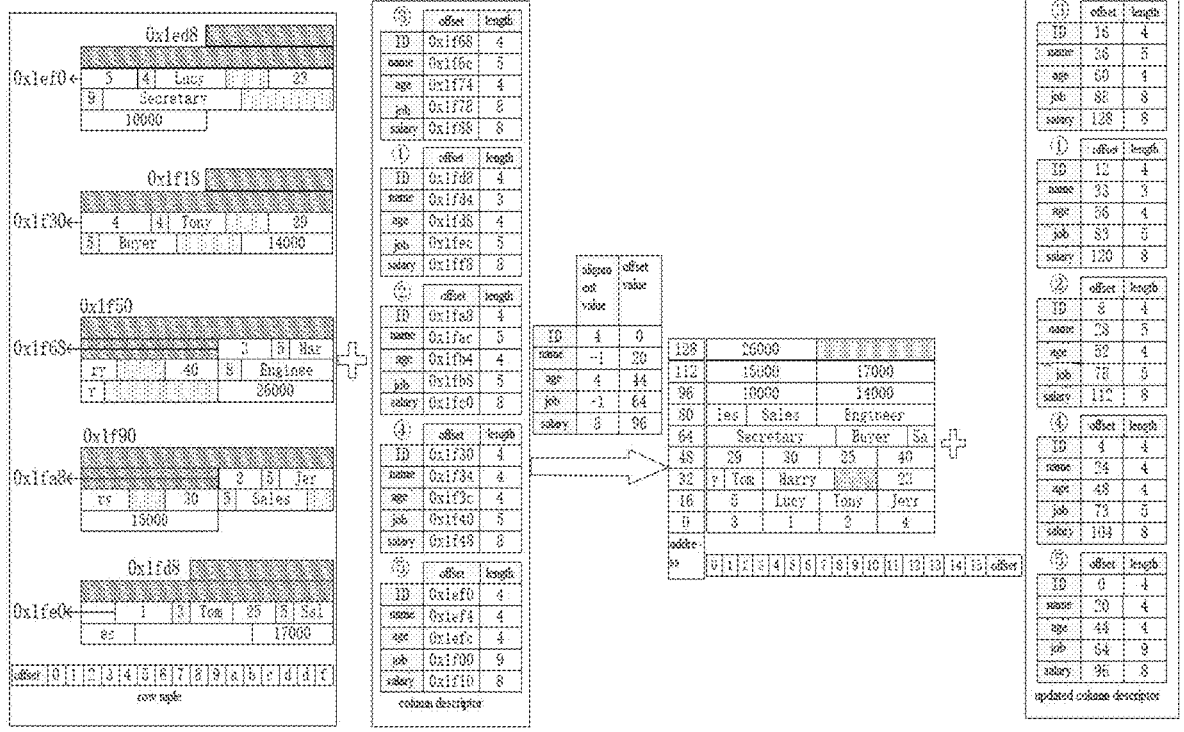
FIG. 24 is a schematic diagram of a calculation principle of copy information in a column storage page provided by the present disclosure.
FIG. 25 is a schematic diagram of an updating principle of a column descriptor provided by the present disclosure.
Figure 26:
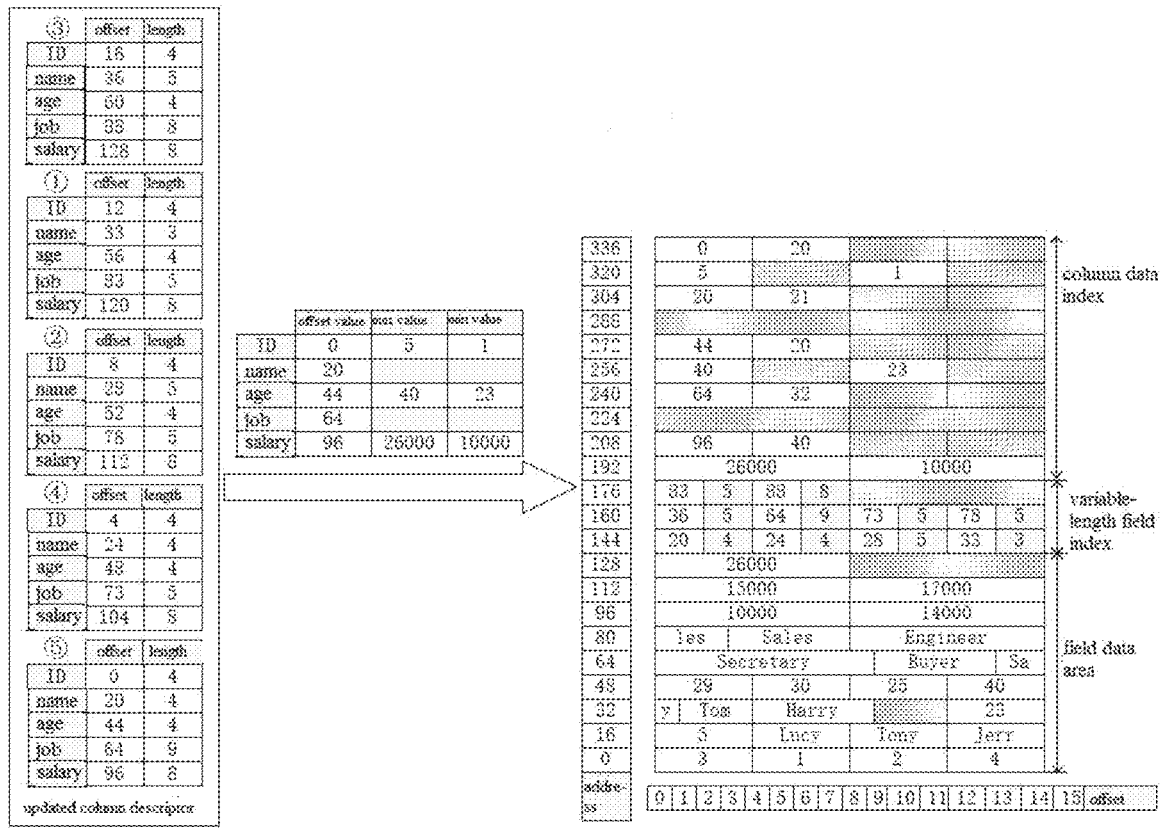
FIG. 26 is a schematic diagram of a generation principle of column storage page data provided by the present disclosure.

Based on the above sixth aspect, an example is provided below, which takes the parsing process of an execution channel as an example, and the implementation method is as follows:
- (1) suppose that the reading module acquires a page data as shown in FIG. 21, which is a schematic diagram of another row storage page data provided by the present disclosure;
- (2) the column fields of each row are parsed by the row-column parsing module to generate column descriptors, the offset and length of each column field are recorded, and the maximum and minimum values of fixed-length fields are updated, as shown in FIG. 22, which is a schematic diagram of a generation principle of the column descriptor provided by the present disclosure;
- (3) the column descriptors are sorted according to a certain column field by the sorting module. Because the column descriptors already include the offset positions of each column field in the page, the data can be directly read by the column descriptors. Take Salary sorting as an example, as shown in FIG. 23, which is a schematic diagram of the sorting principle of the column descriptor provided by the present disclosure;
- (4) calculate the first address offset of each column data in the column storage mode according to the column descriptor by an offset position calculation module, and the main steps are as follows: I. counting the length of each data column; II. aligning and storing each data column according to an alignment value, and updating the maximum value and the minimum value at the same time; III. calculating the index position of variable length field; IV. calculating the initial offset and length of each column index; the calculation process is shown in FIG. 24, which is a schematic diagram of a calculation principle of copy information in a column storage page provided by the present disclosure;
- (5) copy each field from the row storage page to the column storage page according to the updated column descriptor by the field copy module, and update the column descriptor as the offset value of each field in the column storage page after the copying is completed, as shown in FIG. 25, which is a schematic diagram of the updating principle of the column descriptor provided by the present disclosure;
- (6) fill the index area according to the updated column descriptors by an index information filling module, as shown in FIG. 26, which is a schematic diagram of the generation principle of column storage page data provided by the present disclosure.

Apparently, the technical scheme provided by the embodiment of the present disclosure has the following advantages:
- (1) for the development of PostgreSQL native storage format, it can be seamlessly connected with PostgreSQL database without intermediate layer data conversion;
- (2) support indefinite-length tuples and variable-length fields;
- (3) relocate the meta-information of variable-length fields, recalculate the meta-information of variable-length fields and store it centrally, which can effectively improve the data reading efficiency and is more conducive to parallel computing;
- (4) statistical information is added in the operation process, which is convenient for skipping data blocks that do not meet the conditions when conducting OLAP business;
- (5) the optional key-value sorting function enables the converted data to be sorted by key values, which can reduce the reading of redundant data when conducting OLAP business.

The embodiment of the present disclosure provides a storage format conversion apparatus.

Figure 27:
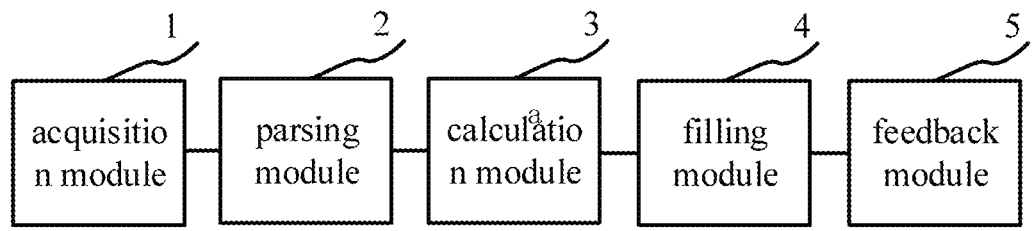
FIG. 27 is a flowchart of a storage format conversion apparatus provided by the present disclosure.

Please refer to FIG. 27, which is a schematic structural diagram of a storage format conversion apparatus provided by the present disclosure. The storage format conversion apparatus can be applied to a coprocessor, including:
- an acquisition module 1, configured to acquire row storage page data and configuration information sent by a main processor, wherein the configuration information includes format information of each column field in a row storage page;

a parsing module 2, configured to parse the row storage page data according to the configuration information to obtain a column descriptor, wherein the column descriptor includes a first offset address and field length of each column field in the row storage page a calculation module 3, configured to calculate and obtain filling information related to a column storage page according to the column descriptor, wherein the filling information includes a first offset address and column length of each data column in the column storage page, wherein each column field with the same field attribute constitutes a data column;

a filling module 4, configured to fill the column storage page according to the filling information to generate column storage page data;

a feedback module 5, configured to feed back the column storage page data to the main processor.

It can be seen that the storage format conversion apparatus provided by the embodiment of the present disclosure, combined with the coprocessor, realizes the conversion of row-column storage format, large consumption of computing power resources of the main processor can be effectively avoided, and higher working efficiency can be ensured. Meanwhile, the row storage page data is parsed by combining with configuration information to obtain the offset address and field length of each column field in the row storage page data, and then the first offset address and field length of each data column in the column storage page are calculated, and the column storage page data corresponding to the row storage page data is generated, thus realizing the conversion of the row-column storage format. It can be seen that this implementation method takes the position information and field length of each column field into account, realizes the conversion of the row-column storage format that can support variable-length field data, and effectively improves the applicability of the row-column conversion method.

In one embodiment of the present disclosure, the parsing module 2 can be specifically configured to determine the data storage format of the row storage page data; parsing the row storage page data according to the data storage format and the configuration information to obtain a column descriptor; wherein, the configuration information is generated by the main processor based on the tuple descriptor corresponding to the row storage page data.

In one embodiment of the present disclosure, the filling information may also include the first offset address and field length of each variable-length column field, and the maximum and minimum values of fixed-length data columns. The filling module 4 may be specifically configured to fill each column field into a field area of the column storage page according to the first offset address and the column length of each data column in the column storage page; fill the first offset address and the field length of each variable-length column field into a variable-length field index area of the column storage page; fill the first offset address and the column length of each data column, and the maximum value and the minimum value of the fixed-length data column into a column data index area of the column storage page.

In an embodiment of the present disclosure, the storage format conversion apparatus may further include a sorting module, which is configured to acquire sorting enabling information; determine sorting data columns according to the sorting enabling information; sort column descriptors according to a sorting mode of the sorted data columns to obtain sorted column descriptors.

In one embodiment of the present disclosure, the coprocessor may include a first preset number of computing units and a first preset number of memories, each computing unit corresponds to a memory, and the acquisition module 1 may be specifically configured to read from the memory corresponding to the current computing unit to obtain the row storage page data, and sending the row storage page data to the memory by the main processor.

In one embodiment of the present disclosure, each computing unit may include a second preset number of execution channels, and the above-mentioned acquisition module 1 may be specifically configured to read and obtain the second preset number of row storage page data from the memory corresponding to the current computing unit;

The storage format conversion apparatus may further include a distribution module, which is configured to distribute the second preset number of row storage page data to the second preset number of execution channels, so as to use each execution channel to execute a step of parsing the row storage page data to obtain the column descriptor.

In one embodiment of the present disclosure, the feedback module 5 can be specifically configured to write back each column storage page to the memory corresponding to the current computing unit, to enable the main processor read and obtain each column storage page data from each memory.

In an embodiment of the present disclosure, the storage format conversion apparatus may further include a compression module, which is configured to compress each column field in the column storage page data according to a preset compression algorithm corresponding to each data column to obtain compressed column storage page data.

For the introduction of the apparatus provided by the embodiment of the present disclosure, please refer to the above-mentioned method embodiment, and the present disclosure will not be repeated here.

The embodiment of the present disclosure provides another storage format conversion apparatus.

Figure 28:
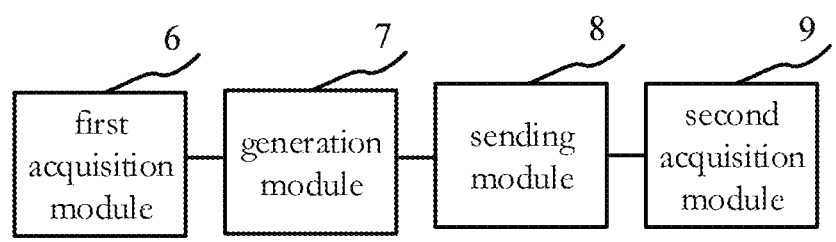
FIG. 28 is a flowchart of another storage format conversion apparatus provided by the present disclosure.

Please refer to FIG. 28, which is a schematic structural diagram of another storage format conversion apparatus provided by the present disclosure. The storage format conversion apparatus can be applied to a main processor, and includes:

a first acquisition module 6, configured to acquire row storage page data and tuple descriptors corresponding to the row storage page data;

a generation module 7, configured to generate configuration information related to the row storage page data according to the tuple descriptors, wherein the configuration information includes format information of each column field in the row storage page data;

a sending module 8, configured to send the row storage page data and the configuration information to a coprocessor, to enable the coprocessor convert the row storage page data into column storage page data according to the configuration information;

a second acquisition module 9, configured to acquire the column storage page data fed back by the coprocessor.

It can be seen that the storage format conversion apparatus provided by the embodiment of the present disclosure, combined with the coprocessor, realizes the conversion of the row-column storage format, which can effectively avoid the large consumption of computing power resources of the main processor and ensure high working efficiency.

For the introduction of the apparatus provided by the embodiment of the present disclosure, please refer to the above-mentioned method embodiment, and the present disclosure will not be repeated here.

The embodiment of the present disclosure provides an electronic device.

Figure 29:
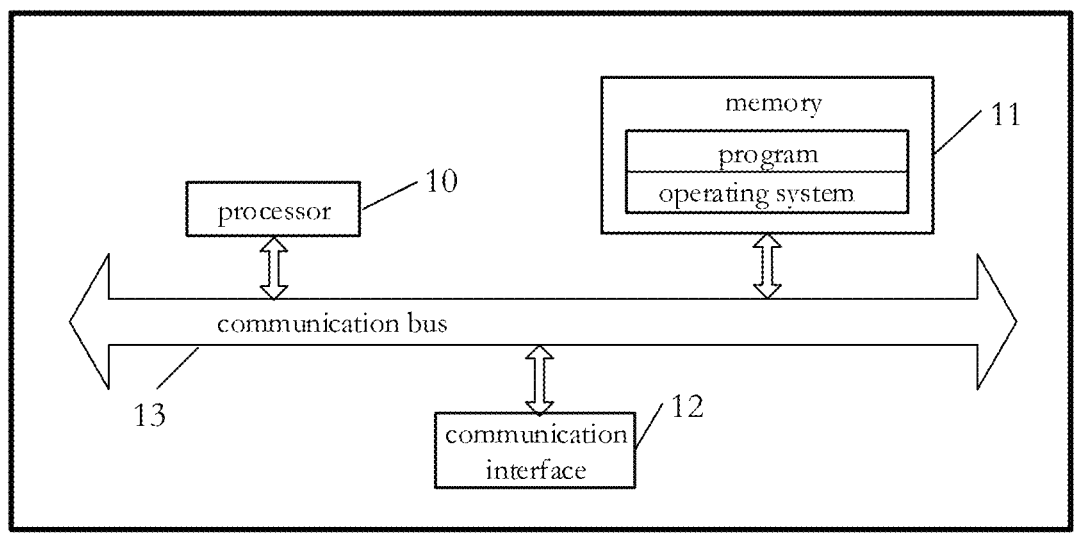
FIG. 29 is a schematic structural diagram of an electronic device provided by the present disclosure.

Please refer to FIG. 29, which is a schematic structural diagram of an electronic device provided by the present disclosure. The electronic device may include:

a memory, configured to store a computer program;

a processor, configured to implement the steps of any one of the storage format conversion methods when executing the computer program.

As shown in FIG. 29, it is a schematic structural diagram of the electronic device, which may include a processor 10, a memory 11, a communication interface 12 and a communication bus 13. The processor 10, the memory 11 and the communication interface 12 all communicate with each other through the communication bus 13.

In this embodiment, the processor 10 may be a Central Processing Unit (CPU), an application specific integrated circuit, a digital signal processor, a field programmable gate array or other programmable logic devices.

The processor 10 can call the program stored in the memory 11, and specifically, the processor 10 can perform the operations in the embodiment of the storage format conversion method.

The memory 11 is configured to store one or more programs, which may include program codes, and the program codes include computer operation instructions. In the embodiment of the present disclosure, at least the programs for realizing the following functions are stored in the memory 11:

acquiring row storage page data and configuration information sent by a main processor, wherein the configuration information includes format information of each column field in a row storage page;

parsing the row storage page data according to the configuration information to obtain a column descriptor, wherein the column descriptor includes a first offset address and field length of each column field in the row storage page;

calculating and obtaining filling information related to a column storage page according to the column descriptor, wherein the filling information includes a first offset address and column length of each data column in the column storage page, wherein each column field with the same field attribute constitutes a data column;

filling the column storage page according to the filling information to generate column storage page data;

feeding back the column storage page data to the main processor; or, acquiring row storage page data and tuple descriptors corresponding to the row storage page data;

generating configuration information related to the row storage page data according to the tuple descriptors, wherein the configuration information includes format information of each column field in the row storage page data;

sending the row storage page data and the configuration information to a coprocessor, to enable the coprocessor convert the row storage page data into column storage page data according to the configuration information;

acquiring the column storage page data fed back by the coprocessor.

In one possible implementation, the memory 11 may include a storage program area and a storage data area, wherein the storage program area may store an operating system, at least one application program required by a function, and the like; The storage data area can store data created during use.

Moreover, the memory 11 may include high-speed random access memory and non-volatile memory, such as at least one disk memory device or other volatile solid-state memory devices.

The communication interface 12 can be an interface of a communication module for connecting with other devices or systems.

Certainly, it should be noted that the structure shown in FIG. 29 does not constitute a limitation to the electronic device in the embodiment of the present disclosure. In practical application, the electronic device may include more or less components than that shown in FIG. 29, or combine some components.

The embodiment of the present disclosure provides a non-transitory readable storage medium.

The non-transitory readable storage medium provided by the embodiment of the present disclosure stores a computer program, and when the computer program is executed by a processor, the steps of any one of the above storage format conversion methods can be implemented.

The non-transitory readable storage medium can include various media that can store program codes, such as a U disk, a mobile hard disk, a Read-Only Memory (ROM), a Random Access Memory (RAM), a magnetic disk or an optical disk.

For the introduction of the non-transitory readable storage medium provided by the embodiment of the present disclosure, please refer to the above-mentioned method embodiment, and the present disclosure will not be repeated here.

Each embodiment in the specification is described in a progressive way, and each embodiment focuses on the differences from other embodiments, so it is only necessary to refer to the same and similar parts between each embodiment. As for the device disclosed in the embodiment, because it corresponds to the method disclosed in the embodiment, the description is relatively simple, and the relevant points can only be described in the method part.

Persons skilled in the art can further realize that the units and algorithm steps of each example described in connection with the embodiments disclosed herein can be realized by electronic hardware, computer software or a combination of the two. In order to clearly illustrate the interchangeability of hardware and software, the components and steps of each example have been generally described according to functions in the above description. Whether these functions are implemented in hardware or software depends on the specific application and design constraints of the technical scheme. Skilled people can use different methods to realize the described functions for each specific application, but this implementation should not be considered beyond the scope of the present disclosure.

The steps of a method or algorithm described in connection with the embodiments disclosed herein may be directly implemented in hardware, a software module executed by a processor, or a combination of the two. The software module can be placed in random access memory (RAM), internal memory, read-only memory (ROM), electrically programmable ROM, electrically erasable programmable ROM, register, hard disk, removable disk, CD-ROM or any other storage medium known in the technical field.

The technical scheme provided by the present disclosure has been introduced in detail above. In this paper, specific examples are used to explain the principle and implementation of the present disclosure, and the description of the above examples is only used to help understand the method and core idea of the present disclosure. It should be pointed out that, for a person skilled in the art, several improvements and modifications can be made to the present disclosure without departing from the principles of the present disclosure, and these improvements and modifications also fall within the protection scope of the present disclosure.

The invention claimed is:

1. A storage format conversion method applied to a coprocessor, comprising:
    acquiring row storage page data and configuration information sent by a main processor, wherein the configuration information comprises format information of each column field in a row storage page;
    parsing the row storage page data according to the configuration information to obtain a column descriptor, wherein the column descriptor comprises a first offset address and field length of each column field in the row storage page;
    calculating and obtaining filling information related to a column storage page according to the column descriptor, wherein the filling information comprises a first offset address and column length of each data column in the column storage page, wherein each column field with the same field attribute constitutes a data column;
    filling the column storage page according to the filling information to generate column storage page data;
    feeding back the column storage page data to the main processor.

2. The storage format conversion method according to claim 1, wherein parsing the row storage page data according to the configuration information to obtain a column descriptor comprises:
    determining a data storage format of the row storage page data;
    parsing the row storage page data according to the data storage format and the configuration information to obtain the column descriptor;
    wherein the configuration information is generated by the main processor based on a tuple descriptor corresponding to the row storage page data.

3. The storage format conversion method according to claim 2, wherein the tuple descriptor is created at the same time as a relational database creating a data table of a row storage page type, and the tuple descriptor is configured to describe format information of each column field in the data table.

4. The storage format conversion method according to claim 2, wherein the data storage format of the row storage page data comprises any one or more of the following:
    a storage location of data information itself, a storage location of metadata of data information and a storage location of description information of data information.

5. The storage format conversion method according to claim 1, wherein the filling information further comprises a first offset address and field length of each variable-length column field, and a maximum value and a minimum value of a fixed-length data column, and the filling the column storage page according to the filling information to generate column storage page data comprises:
    filling each column field into a field area of the column storage page according to the first offset address and the column length of each data column in the column storage page,;
    filling the first offset address and the field length of each variable-length column field into a variable-length field index area of the column storage page;
    filling the first offset address and the column length of each data column, and the maximum value and the minimum value of the fixed-length data column into a column data index area of the column storage page.

6. The storage format conversion method according to claim 1, wherein filling the column storage page according to the filling information to generate column storage page data comprises:
    determining a data storage format of the column storage page;
    filling the filling information into the column storage page according to the data storage format to generate the column storage page.

7. The storage format conversion method according to claim 6, further comprising:
    acquiring a field alignment mode of a column field in preset configuration information;
    during a filling process, performing filling alignment according to the data storage format.

8. The storage format conversion method according to claim 1, wherein after parsing the row storage page data to obtain a column descriptor, the method further comprises:
    acquiring sorting enabling information;
    determining sorting data columns according to the sorting enabling information;
    sorting column descriptors according to a sorting mode of the sorted data columns to obtain sorted column descriptors.

9. The storage format conversion method according to claim 1, wherein the coprocessor comprises a first preset number of computing units and the first preset number of memories, each computing unit corresponds to one of the memories, and the obtaining row storage page data sent by a main processor comprises:
    reading from the memory corresponding to the current computing unit to obtain the row storage page data, and sending the row storage page data to the memory by the main processor.

10. The storage format conversion method according to claim 9, wherein each computing unit comprises a second preset number of execution channels, and reading from the memory corresponding to the current computing unit to obtain the row storage page data comprises:
    reading from the memory corresponding to the current computing unit to obtain the second preset number of row storage page data;
    after reading from the memory corresponding to the current computing unit to obtain the row storage page data, the method further comprising:
    distributing the second preset number of row storage page data to the second preset number of execution channels, so as to use each execution channel to execute a step of parsing the row storage page data to obtain the column descriptor.

11. The storage format conversion method according to claim 10, wherein feeding back the column storage page data to the main processor comprises:
    writing back each column storage page to the memory corresponding to the current computing unit, to enable the main processor read and obtain each column storage page data from each memory.

12. The storage format conversion method according to claim 1, wherein before feeding back the column storage page data to the main processor, the method further comprises:

compressing each column field in the column storage page data according to a preset compression algorithm corresponding to each data column to obtain compressed column storage page data.

13. The storage format conversion method according to claim 12, wherein the compressing each column field in the column storage page data according to a preset compression algorithm corresponding to each data column to obtain compressed column storage page data comprises:

determining data types of column fields in each data column, determining a corresponding preset compression algorithm according to the data types, and performing compression processing on each column field in the column storage page data according to the preset compression algorithm.

14. An electronic device, comprising:
a memory, configured to store a computer program;
a processor, configured to implement steps of a storage format conversion method according to claim 1 when executing the computer program.

15. The electronic device according to claim 14, when executing the computer program the processor is configured to implement steps of the storage format conversion method, wherein parsing the row storage page data according to the configuration information to obtain a column descriptor comprises:

determining a data storage format of the row storage page data;
parsing the row storage page data according to the data storage format and the configuration information to obtain the column descriptor;
wherein the configuration information is generated by the main processor based on a tuple descriptor corresponding to the row storage page data.

16. The electronic device according to claim 14, when executing the computer program the processor is configured to implement steps of the storage format conversion method, wherein the tuple descriptor is created at the same time as a relational database creating a data table of a row storage page type, and the tuple descriptor is configured to describe format information of each column field in the data table.

17. A non-transitory readable storage medium, wherein a computer program is stored on the non-transitory readable storage medium, and when the computer program is executed by a processor, steps of a storage format conversion method according to claim 1 are implemented.

18. A storage format conversion method applied to a main processor, comprising:

acquiring row storage page data and tuple descriptors corresponding to the row storage page data;
generating configuration information related to the row storage page data according to the tuple descriptors, wherein the configuration information comprises format information of each column field in the row storage page data;
sending the row storage page data and the configuration information to a coprocessor, to enable the coprocessor convert the row storage page data into column storage page data according to the configuration information;
acquiring the column storage page data fed back by the coprocessor;
wherein a process of converting the row storage page data into the column storage page data by the coprocessor according to the configuration information comprises the following steps:
parsing the row storage page data according to the configuration information to obtain a column descriptor, wherein the column descriptor comprises a first offset address and field length of each column field in the row storage page;
calculating and obtaining filling information related to a column storage page according to the column descriptor, wherein the filling information comprises a first offset address and column length of each data column in the column storage page, wherein each column field with the same field attribute constitutes a data column;
filling the column storage page according to the filling information to generate column storage page data.

19. A storage format conversion system comprising a main processor and a coprocessor;
the main processor is configured to send row storage page data and configuration information to the coprocessor, and acquire column storage page data fed back by the coprocessor;
the coprocessor is configured to parse the row storage page data according to the configuration information to obtain a column descriptor, wherein the column descriptor comprises a first offset address and field length of each column field in the row storage page; calculate and obtain filling information related to a column storage page according to the column descriptor, wherein the filling information comprises a first offset address and column length of each data column in the column storage page, wherein each column field with the same field attribute constitutes a data column; fill the column storage page according to the filling information to generate column storage page data.

20. The storage format conversion system according to claim 19, wherein the main processor is a CPU and the co-processor is an FPGA.

* * * * *